United States Patent
Kajita

(10) Patent No.: US 9,594,272 B2
(45) Date of Patent: Mar. 14, 2017

(54) DISPLAY DEVICE

(71) Applicant: Panasonic Liquid Crystal Display Co., Ltd., Himeji-shi, Hyogo (JP)

(72) Inventor: Daisuke Kajita, Osaka (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 14/792,245

(22) Filed: Jul. 6, 2015

(65) Prior Publication Data

US 2015/0309362 A1    Oct. 29, 2015

Related U.S. Application Data

(63) Continuation of application No. 14/189,528, filed on Feb. 25, 2014, now Pat. No. 9,104,078.

(30) Foreign Application Priority Data

Sep. 30, 2013    (JP) .................. 2013-205094

(51) Int. Cl.
*G02F 1/1335* (2006.01)
*G02F 1/1362* (2006.01)
*G02F 1/1343* (2006.01)

(52) U.S. Cl.
CPC .. *G02F 1/133514* (2013.01); *G02F 1/133512* (2013.01); *G02F 1/133621* (2013.01); *G02F 1/134336* (2013.01); *G02F 1/136209* (2013.01)

(58) Field of Classification Search
CPC ......... G02F 1/133514; G02F 1/133512; G02F 1/133621; G02F 1/134336; G02F 1/136209
See application file for complete search history.

(56) References Cited

U.S. PATENT DOCUMENTS

| | | | |
|---|---|---|---|
| 7,920,243 B2 * | 4/2011 | Lee | ............. G02F 1/13394 349/106 |
| 8,269,925 B2 | 9/2012 | Ochiai et al. | |
| 8,330,905 B2 | 12/2012 | Lee et al. | |
| 2009/0290080 A1 | 11/2009 | Horiuchi et al. | |
| 2010/0245734 A1 | 9/2010 | Tanno et al. | |
| 2012/0038866 A1 | 2/2012 | Matsui et al. | |
| 2013/0235289 A1 | 9/2013 | Yamaguchi et al. | |

FOREIGN PATENT DOCUMENTS

| | | |
|---|---|---|
| JP | 8-029778 | 2/1996 |
| JP | 11-072801 | 3/1999 |
| JP | 2009-036795 | 2/2009 |
| JP | 2009-229485 | 10/2009 |
| JP | 2011-013696 | 1/2011 |
| JP | 2013-186165 | 9/2013 |

* cited by examiner

*Primary Examiner* — James Dudek
(74) *Attorney, Agent, or Firm* — Hamre, Schumann, Mueller & Larson, P.C.

(57) ABSTRACT

Provided is a display device, in which: a center position of a row-wise width of a black matrix located between a red pixel and a green pixel is displaced toward a red pixel side from the center position of a row-wise line width of a data line overlapping with the black matrix in a plan view; and the center position of the row-wise width of the black matrix located between the green pixel and a blue pixel is displaced toward a blue pixel side from the center position of the row-wise line width of the data line overlapping with the black matrix in a plan view.

6 Claims, 20 Drawing Sheets

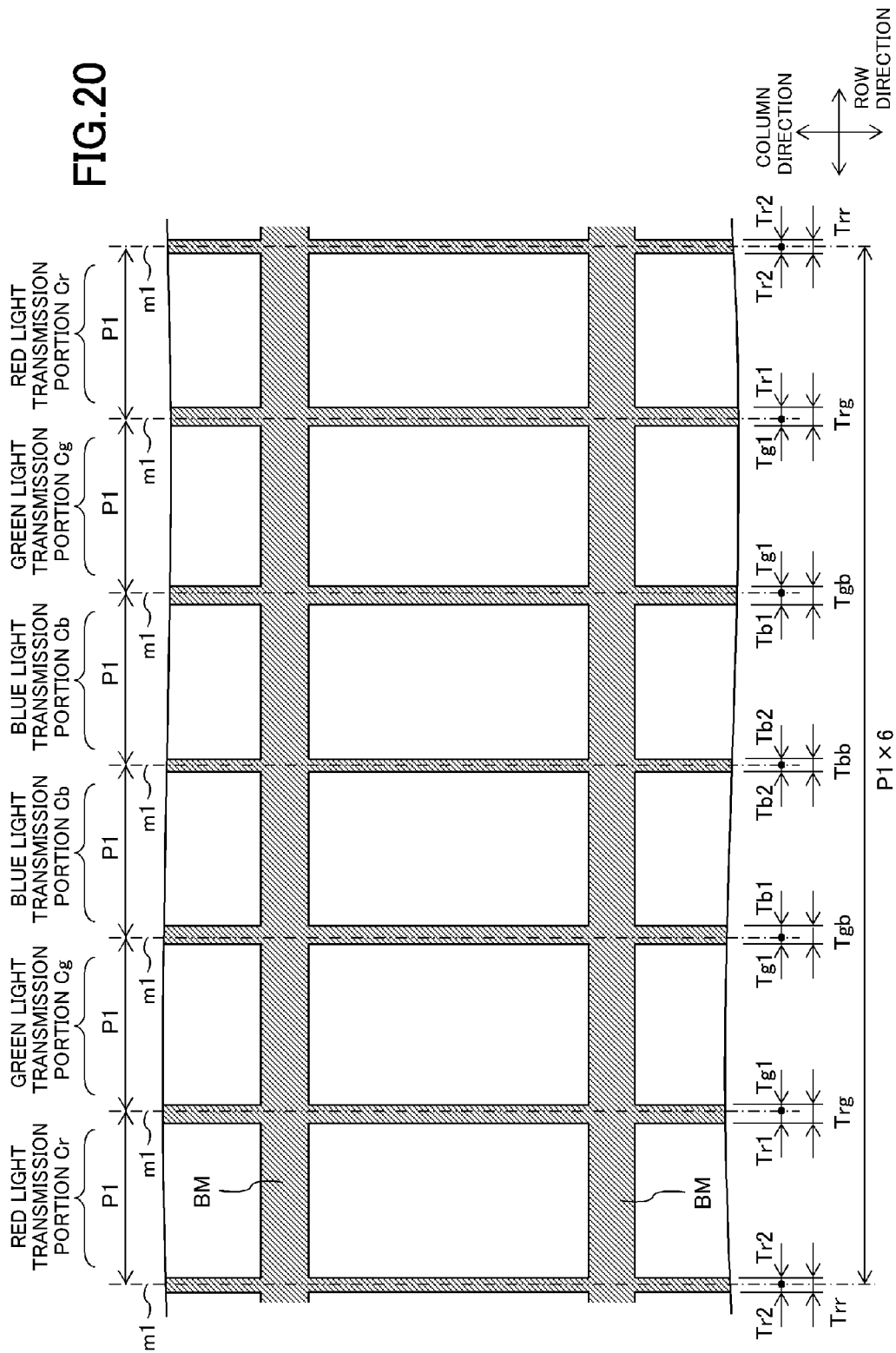

DISPLAY DEVICE

CROSS-REFERENCE TO RELATED APPLICATION

The present application claims priority from Japanese application JP2013-205094 filed on Sep. 30, 2013, the content of which is hereby incorporated by reference into this application.

TECHNICAL FIELD

The present invention relates to a display device.

BACKGROUND

A liquid crystal display device includes: a thin film transistor substrate (hereinafter referred to as "TFT substrate") located on a back surface side; a color filter substrate (hereinafter referred to as "CF substrate") located on a front surface side (display surface side) and opposed to the TFT substrate; and a liquid crystal layer sandwiched between the TFT substrate and the CF substrate. Colored portions for different colors (for example, red color, green color, and blue color) and a light shielding portion (hereinafter referred to as "black matrix") located in a boundary between the respective colored portions are formed in the CF substrate. Up to now, the liquid crystal display device has a known problem in that a color mixture ascribable to a leak of light from adjacent pixel regions occurs due to deviation or the like caused when the TFT substrate and the CF substrate are bonded together. The color mixture is conspicuously exhibited particularly in a case where a line of sight of a human is in a diagonal direction relative to the liquid crystal panel, which deteriorates display quality. For example, a red pixel exhibits a color tint mixed with the blue color when viewed diagonally, which cannot produce desired display quality.

A technology for reducing an occurrence of the color mixture is disclosed in, for example, Japanese Patent Application Laid-open No. Hei 11-72801. In a liquid crystal display device disclosed in Japanese Patent Application Laid-open No. Hei 11-72801, an area defined in consideration of a deviation amount caused when the TFT substrate and the CF substrate are bonded together and an area defined in consideration of light shielding effected when the liquid crystal panel is viewed diagonally are added to an area in which the black matrix is formed.

SUMMARY

However, the technology disclosed in Japanese Patent Application Laid-open No. Hei 11-72801 raises a problem in that an aperture ratio of a pixel decreases because a width of a black matrix is large.

The present invention has been made in view of the above-mentioned problem, and an object thereof is to provide a display device capable of improving an aperture ratio of a pixel while suppressing deterioration of display quality ascribable to a color mixture.

In order to solve the above-mentioned problem, a display device according to one embodiment of the present invention includes: a first substrate on a back surface side; and a second substrate on a display surface side, the first substrate and the second substrate being opposed to each other, wherein: the first substrate comprises: a plurality of data lines formed thereon; a plurality of gate lines formed thereon; and a plurality of pixel electrodes formed thereon and arranged so as to correspond to each of a plurality of pixels formed in a column direction in which the plurality of data lines extend and in a row direction in which the plurality of gate lines extend; the second substrate comprises: a plurality of light transmission portions formed thereon, for transmitting light, and arranged so as to correspond to each of the plurality of pixels; and a light shielding portion formed thereon, for blocking light from transmitting therethrough, and formed around each of the plurality of light transmission portions; the plurality of pixels comprises: a red pixel corresponding to a red light transmission portion for transmitting red light; a green pixel corresponding to a green light transmission portion for transmitting green light; and a blue pixel corresponding to a blue light transmission portion for transmitting blue light; a center position of a row-wise width of the light shielding portion located between the red pixel and the green pixel is displaced toward a red pixel side from the center position of a row-wise line width of each of the plurality of data lines overlapping with the light shielding portion in a plan view; and the center position of the row-wise width of the light shielding portion located between the green pixel and the blue pixel is displaced toward a blue pixel side from the center position of the row-wise line width of each of the plurality of data lines overlapping with the light shielding portion in the plan view.

In the display device according to one embodiment of the present invention, it is preferred that the red pixel, the green pixel, and the blue pixel be arrayed in the row direction repetitively in the stated order, and each of the row-wise width of the light shielding portion located between the red pixel and the green pixel and the row-wise width of the light shielding portion located between the green pixel and the blue pixel be smaller than the row-wise width of the light shielding portion located between the red pixel and the blue pixel.

In the display device according to one embodiment of the present invention, it is preferred that the row-wise width in the green light transmission portion be larger than the row-wise width in the red light transmission portion and larger than the row-wise width in the blue light transmission portion.

In the display device according to one embodiment of the present invention, it is preferred that a distance in the plan view between: the center position of the row-wise line width of each of the plurality of data lines overlapping with the light shielding portion located between the red pixel and the green pixel; and an edge portion on the red pixel side in the light shielding portion be equal to a distance between: the center position of the row-wise line width of each of the plurality of data lines overlapping with the light shielding portion located between the red pixel and the blue pixel; and the edge portion on the red pixel side in the light shielding portion, and the distance in the plan view between: the center position of the row-wise line width of each of the plurality of data lines overlapping with the light shielding portion located between the green pixel and the blue pixel; and an edge portion on the blue pixel side in the light shielding portion be equal to a distance between: the center position of the row-wise line width of each of the plurality of data lines overlapping with the light shielding portion located between the blue pixel and the red pixel; and the edge portion on the blue pixel side in the light shielding portion.

In the display device according to one embodiment of the present invention, a plurality of pixel groups, in each of which the red pixel, the green pixel, the blue pixel, the blue pixel, the green pixel, and the red pixel are arrayed in the row direction in the stated order, may be arrayed in the row direction and the column direction.

In the display device according to one embodiment of the present invention, it is preferred that each of the row-wise width in the light shielding portion located between the adjacent blue pixels and the row-wise width in the light shielding portion located between the adjacent red pixels be smaller than each of the row-wise width in the light shielding portion located between the red pixel and the green pixel and the row-wise width in the light shielding portion located between the green pixel and the blue pixel.

In the display device according to one embodiment of the present invention, it is preferred that: a distance in the plan view between: the center position of the row-wise line width of each of the plurality of data lines overlapping with the light shielding portion located between the adjacent red pixels; and a row-wise edge portion in the light shielding portion is smaller than a distance between: the center position of the row-wise line width of each of the plurality of data lines overlapping with the light shielding portion located between the red pixel and the green pixel; and the edge portion on the red pixel side in the light shielding portion; and the distance in the plan view between: the center position of the row-wise line width of each of the plurality of data lines overlapping with the light shielding portion located between the adjacent blue pixels; and a row-wise edge portion in the light shielding portion is smaller than a distance between: the center position of the row-wise line width of each of the plurality of data lines overlapping with the light shielding portion located between the blue pixel and the green pixel; and the edge portion on the blue pixel side in the light shielding portion.

BRIEF DESCRIPTION OF THE DRAWINGS

FIG. 20 is a plan view illustrating a configuration of a part of the black matrix.

DETAILED DESCRIPTION (First Embodiment)

An embodiment of the present invention is described below with reference to the accompanying drawings. In the embodiment of the present invention, a liquid crystal display device is taken as an example, but a display device according to the present invention is not limited to the liquid crystal display device, and may be, for example, an organic EL display device.

Figure 1:
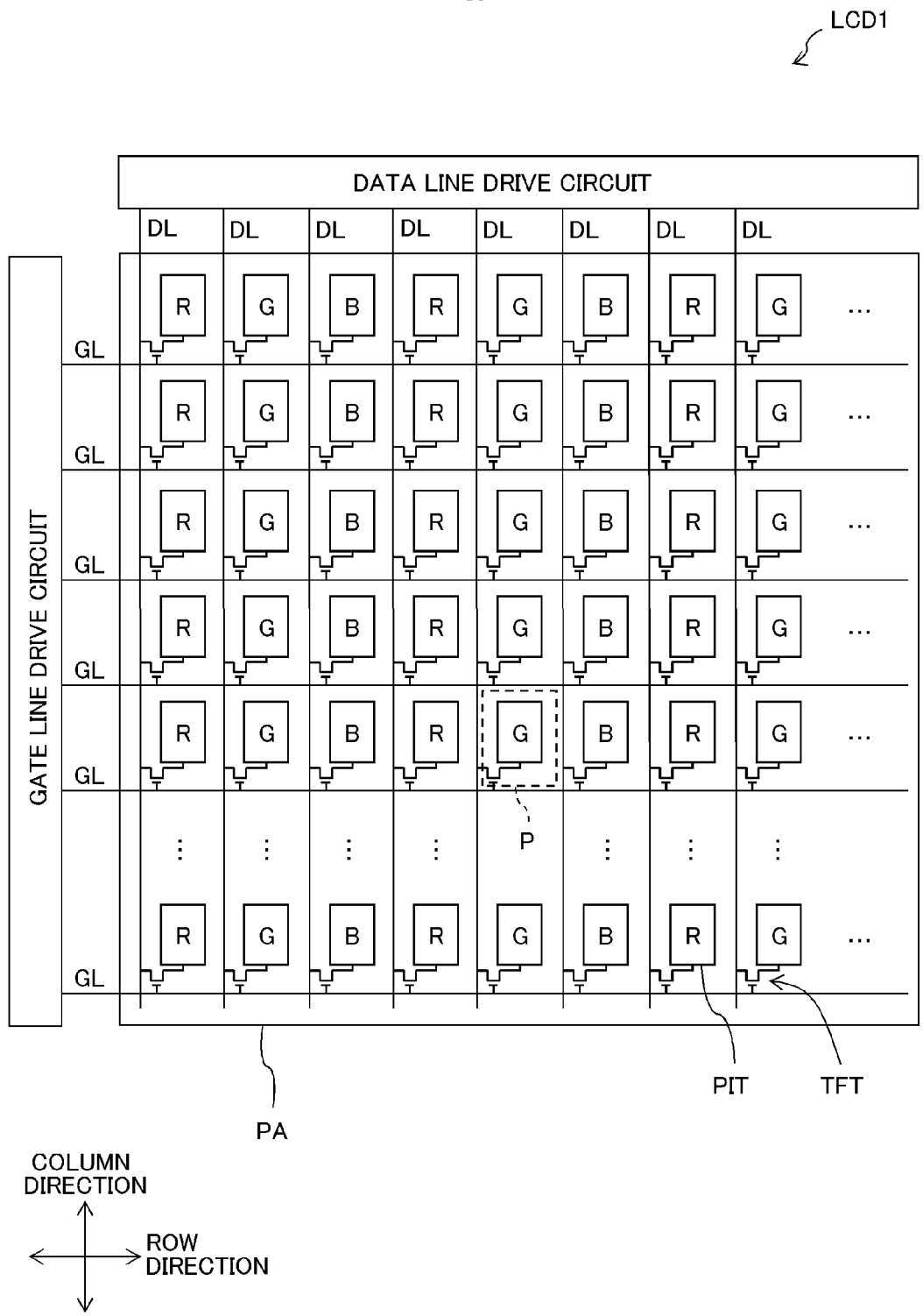
FIG. 1 is a plan view illustrating a configuration of a liquid crystal display device according to a first embodiment of the present invention.

FIG. 1 is a plan view illustrating an overall configuration of a liquid crystal display device according to a first embodiment of the present invention. A liquid crystal display device LCD1 includes a display panel PA for displaying an image, drive circuits (data line drive circuit and gate line drive circuit) for driving the display panel PA, a control circuit (not shown) for controlling the drive circuits, and a backlight (not shown) for illuminating the display panel PA with light from a back surface side. Note that, the drive circuits may be mounted to the display panel PA.

Figure 2:
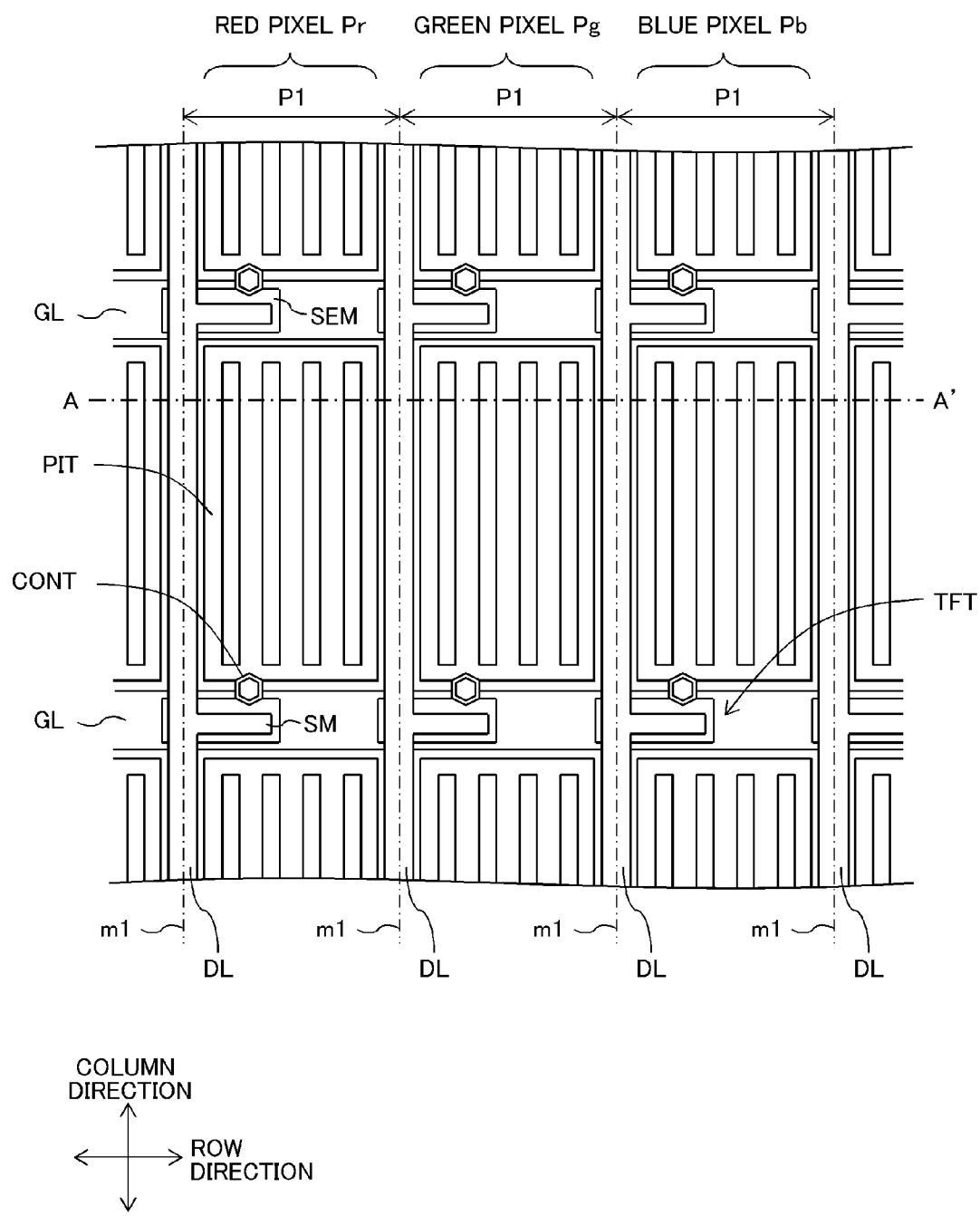
FIG. 2 is a plan view illustrating a configuration of a part of a display panel.
Figure 3:
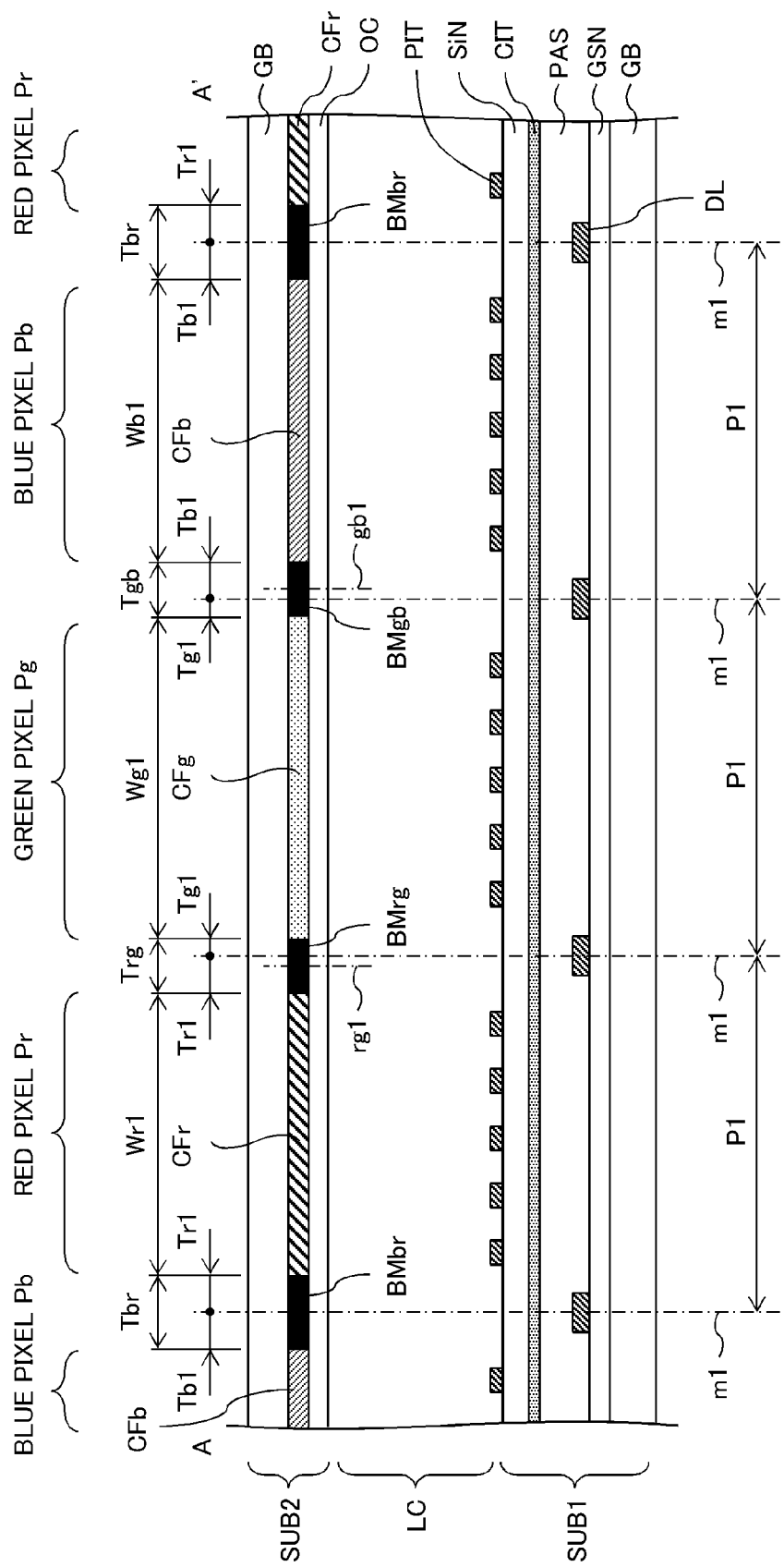
FIG. 3 is a sectional view taken along the line A-A' of FIG. 2.
Figure 4:
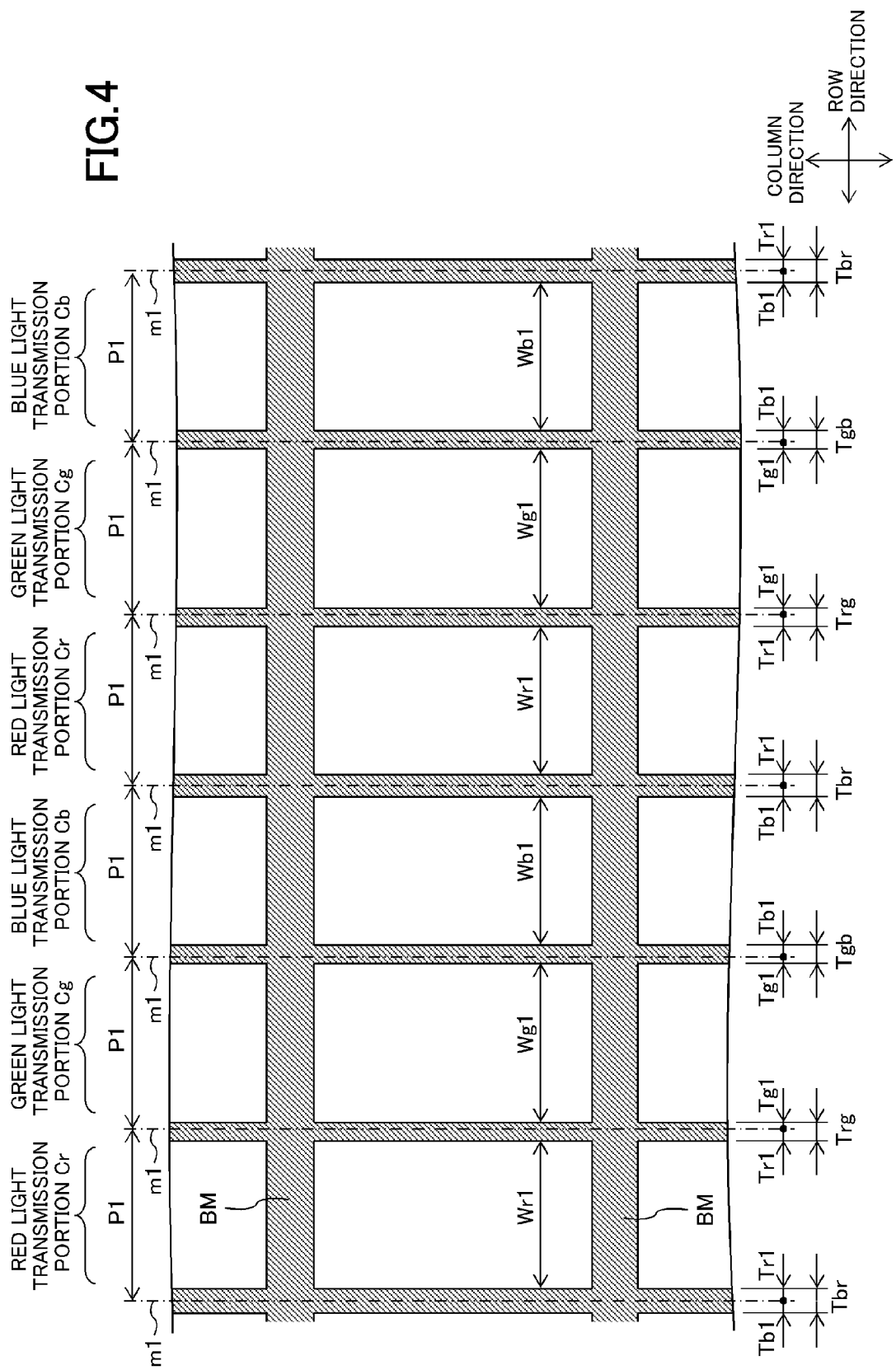
FIG. 4 is a plan view illustrating a configuration of a part of a black matrix.

FIG. 2 is a plan view illustrating a configuration of a part of the display panel PA, and FIG. 3 is a sectional view taken along the line A-A' of FIG. 2. As illustrated in FIG. 3, the display panel PA includes: a thin film transistor substrate (hereinafter referred to as "TFT substrate") SUB1 (first substrate) located on the back surface side; a color filter substrate (hereinafter referred to as "CF substrate") SUB2 (second substrate) located on a front surface side (display surface side) and opposed to the TFT substrate SUB1; and a liquid crystal layer LC sandwiched between the TFT substrate SUB1 and the CF substrate SUB2. Note that, for the sake of convenience, FIG. 2 illustrates a state of the TFT substrate SUB1 viewed from the front surface side through the CF substrate SUB2. FIG. 4 is a plan view illustrating a configuration of a part of a light shielding portion (hereinafter referred to as "black matrix BM") provided to the CF substrate SUB2. FIG. 4 illustrates a state thereof viewed from the front surface side.

As illustrated in FIG. 1 and FIG. 2, a plurality of data lines DL and a plurality of gate lines GL are formed on the TFT substrate SUB1 so as to extend in a column direction and in a row direction, respectively, a thin film transistor (hereinafter referred to as "TFT") is formed in the vicinity of each of intersections between the plurality of data lines DL and the plurality of gate lines GL, a rectangular area surrounded by two adjacent data lines DL and two adjacent gate lines GL is defined as one pixel P, and a plurality of the pixels P are arranged in a matrix shape (in the row direction and the column direction). A pixel electrode PIT formed of a transparent conductive film of indium tin oxide (ITO) or the like is provided to each of the pixels P. As illustrated in FIG. 2, each of the pixel electrodes PIT includes aperture portions (for example, slits) to be formed to have a stripe shape. In the TFT, a semiconductor layer SEM formed of amorphous silicon (aSi) is formed on a gate insulating film (not shown), and a drain electrode SM and a source electrode (not shown) are formed on the semiconductor layer SEM. The drain electrode SM is electrically connected to the data line DL, and the source electrode is electrically connected to the pixel electrode PIT via a contact hole CONT. Note that, the data lines DL are arrayed in the row direction at even intervals P1.

As illustrated in FIG. 4, in the CF substrate SUB2, a light transmission portion C is formed so as to correspond to each of the pixels P. The light transmission portion C is surrounded by the black matrix BM for blocking light from transmitting therethrough and is formed to have a rectangular shape. Further, a plurality of light transmission portions C include: a red light transmission portion Cr in which a colored portion for the red color (red color portion CFr) is formed to transmit red (R-color) light; a green light transmission portion Cg in which a colored portion for the green color (green color portion CFg) is formed to transmit green (G-color) light; and a blue light transmission portion Cb in which a colored portion for the blue color (blue color portion CFb) is formed to transmit blue (B-color) light. The red light transmission portion Cr, the green light transmission portion Cg, and the blue light transmission portion Cb are arrayed in the row direction repetitively in the stated order, the light transmission portions C for the same color are arrayed in the column direction, and the black matrix BM is formed in the area between the light transmission portions C that are adjacent to each other in the row direction and the column direction.

As illustrated in FIG. 2 and FIG. 3, a plurality of pixels P include a red pixel Pr corresponding to the red light transmission portion Cr, a green pixel Pg corresponding to the green light transmission portion Cg, and a blue pixel Pb corresponding to the blue light transmission portion Cb. Further, those pixels P are arrayed so as to correspond to the arrangement of the light transmission portions C, and the red pixel Pr, the green pixel Pg, and the blue pixel Pb are arrayed in the row direction repetitively in the stated order, while the pixels P of the same color are arrayed in the column direction. In FIG. 2 to FIG. 4, m1 represents a center line of the data line DL.

A stacked structure of the respective portions that form the pixel P is not limited to the configuration illustrated in FIG. 3, and a known configuration may be applied thereto. In the configuration illustrated in FIG. 3, in the TFT substrate SUB1, a gate line GL (not shown) is formed on a glass substrate GB, an insulating film GSN is formed so as to cover the gate lines GL, the data line DL is formed on the insulating film GSN, an insulating film PAS is formed so as to cover the data line DL, a common electrode CIT is formed on the insulating film PAS, an insulating film SiN is formed so as to cover the common electrode CIT, and the pixel electrode PIT is formed on the insulating film SiN. Meanwhile, in the CF substrate SUB2, the black matrix BM and the colored portion CF are formed on the glass substrate GB, and an overcoat layer OC is formed so as to cover those. In addition, although not shown, an alignment layer, a polarizing plate, and the like are formed. According to the configuration illustrated in FIG. 3, the present liquid crystal display device LCD1 has a configuration using a so-called in plane switching (IPS) system, but the display device according to the present invention is not limited thereto.

Figure 5:
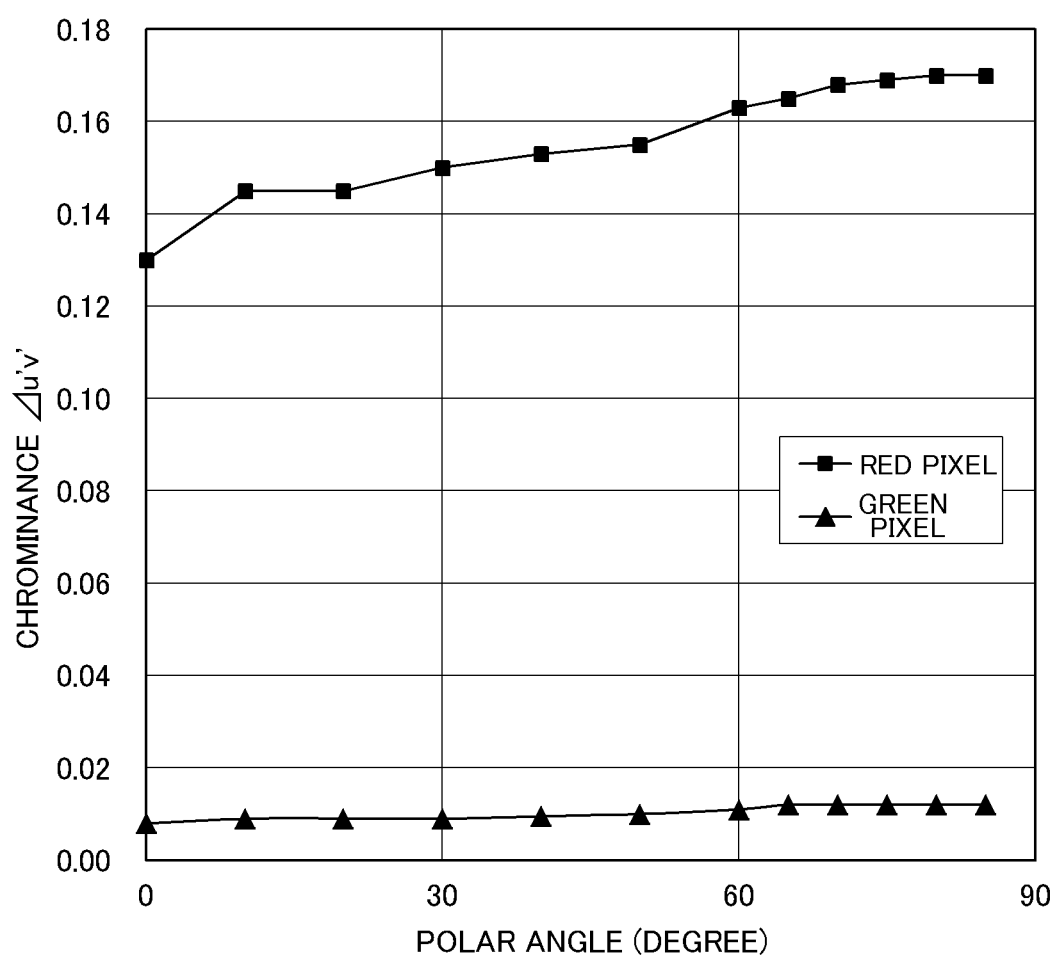
FIG. 5 is a graph showing an example of measurement results of a chrominance.

Here, consideration is given to a color mixture ascribable to a leak of light from adjacent pixel regions. The color mixture can be expressed by using a so-called chrominance $\Delta$(delta)u'v'. The chrominance $\Delta$u'v' represents a distance between two points in a u'v' chromaticity diagram (CIE 1976 uniform chromaticity scale (UCS) chromaticity diagram) created by converting xy chromaticity coordinates and is substantially proportionate to a perceived color difference. FIG. 5 is a graph showing an example of measurement results of the chrominance $\Delta$u'v'. Here, as an example, FIG. 5 shows results obtained by measuring a distance between the u'v' chromaticity coordinates relative to a frontal direction (polar angle of 0 degrees) in a case where a deviation amount between the TFT substrate SUB1 and the CF substrate SUB2 is 0 μm and the u'v' chromaticity coordinates relative to a polar angle of 0 degrees to 85 degrees in a case where the deviation amount is 20 μm. Note that, the polar angle represents an angle to a direction of the normal to a plane (display surface) of the display panel PA. In other words, the polar angle of 0 degrees means that the display panel PA is viewed from the frontal direction, and a polar angle of 90 degrees means that the display panel PA is viewed from an edge-on direction. Note that, in the measurement results, the chrominance $\Delta$u'v' of the red pixel Pr and the chrominance $\Delta$u'v' of the blue pixel Pb have substantially the same values, and hence the graph of FIG. 5 shows the chrominance $\Delta$u'v' of the red pixel Pr as a representative.

According to the graph of FIG. 5, it is understood that the chrominance $\Delta$u'v' of the red pixel Pr (and the blue pixel Pb) at the polar angle of 0 degrees is approximately 0.13 and that the color mixture occurs even in the case of being viewed from the frontal direction. This is because the deviation amount between the TFT substrate SUB1 and the CF substrate SUB2 is large, and, for example, the red light transmission portion Cr of the CF substrate SUB2 partially overlaps with the area of the blue pixel Pb of the TFT substrate SUB1. Further, it is understood that the chrominance $\Delta$u'v' of the green pixel Pg is smaller than the chrominance $\Delta$u'v' of the red pixel Pr and the blue pixel Pb. Specifically, the green pixel Pg has the chrominance $\Delta$u'v' equal to or smaller than 0.02. This is a level at which the color mixture is hard to be recognized with an eye of the human, and it is understood that the eye of the human is highly resistant to the color mixture in the green color.

The color mixture having such a characteristic has a correlation with an aperture ratio (aperture width) of the pixel, and in general, as the aperture ratio becomes higher, the color mixture is more likely to occur (the chrominance $\Delta$u'v' becomes larger). However, according to the above-mentioned measurement results shown in FIG. 5, with regard to the green pixel Pg, it is considered that an aperture ratio can be further increased within the range that the color mixture is hard to be recognized with the eye of the human. Note that, when the aperture ratio (aperture width) of the red pixel Pr and the blue pixel Pb decreases with an improvement in the aperture ratio (aperture width) of the green pixel Pg, the aperture ratio of the pixels over the entire liquid crystal display device decreases, and hence it is preferred that the improvement in the aperture ratio (aperture width) of only the green pixel Pg be achieved while maintaining the aperture ratio (aperture width) of the red pixel Pr and the blue pixel Pb. This allows the aperture ratio of the pixels of the liquid crystal display device LCD1 to be improved while suppressing deterioration of display quality ascribable to the color mixture. A specific configuration for obtaining the above-mentioned effect is described below.

As illustrated in FIG. 3 and FIG. 4, the center line of a black matrix BMbr located in a boundary between the blue pixel Pb (blue light transmission portion Cb) and the red pixel Pr (red light transmission portion Cr) coincides with the center line m1 of the data line DL overlapping with the black matrix BMbr in the plan view. A center line rg1 of a black matrix BMrg located in a boundary between the red pixel Pr and the green pixel Pg (green light transmission portion Cg) is displaced toward a red pixel Pr side from the center line m1 of the data line DL overlapping with the black matrix BMrg in the plan view. A center line gb1 of a black matrix BMgb located in a boundary between the green pixel Pg and the blue pixel Pb is displaced toward a blue pixel Pb side from the center line m1 of the data line DL overlapping with the black matrix BMgb in the plan view. Further, a row-wise width Trg of the black matrix BMrg and a row-wise width Tgb of the black matrix BMgb are equal to each other and smaller than a row-wise width Tbr of the black matrix BMbr (Trg=Tgb<Tbr). In addition, in the width Tbr of the black matrix BMbr, a distance Tb1 between the center line m1 of the data line DL and an edge portion on the blue pixel Pb side and a distance Tr1 between the center line m1 and an edge portion on the red pixel Pr side are equal to each other (Tb1=Tr1). In the width Trg of the black matrix BMrg, a distance Tg1 between the center line m1 of the data line DL and an edge portion on a green pixel Pg side is smaller than the distance Tr1 between the center line m1 and the edge portion on the red pixel Pr side (Tg1<Tr1). In the width Tgb of the black matrix BMgb, the distance Tg1 between the center line m1 of the data line DL and the edge portion on the green pixel Pg side is smaller than the distance Tb1 between the center line m1 and the edge portion on the blue pixel Pb side (Tg1<Tb1).

According to the above-mentioned configuration, an aperture width Wg1 of the green pixel Pg (green light transmission portion Cg) is larger than an aperture width Wr1 of the red pixel Pr (red light transmission portion Cr) and an aperture width Wb1 of the blue pixel Pb (blue light transmission portion Cb) by $\Delta\alpha$. $\Delta\alpha$ can be expressed by the following expression.

$$\Delta\alpha = (Tr1 - Tg1) + (Tb1 - Tg1)$$

$$= (Tr1 - Tg1) \times 2$$

$$= (Tb1 - Tg1) \times 2$$

Figure 6:
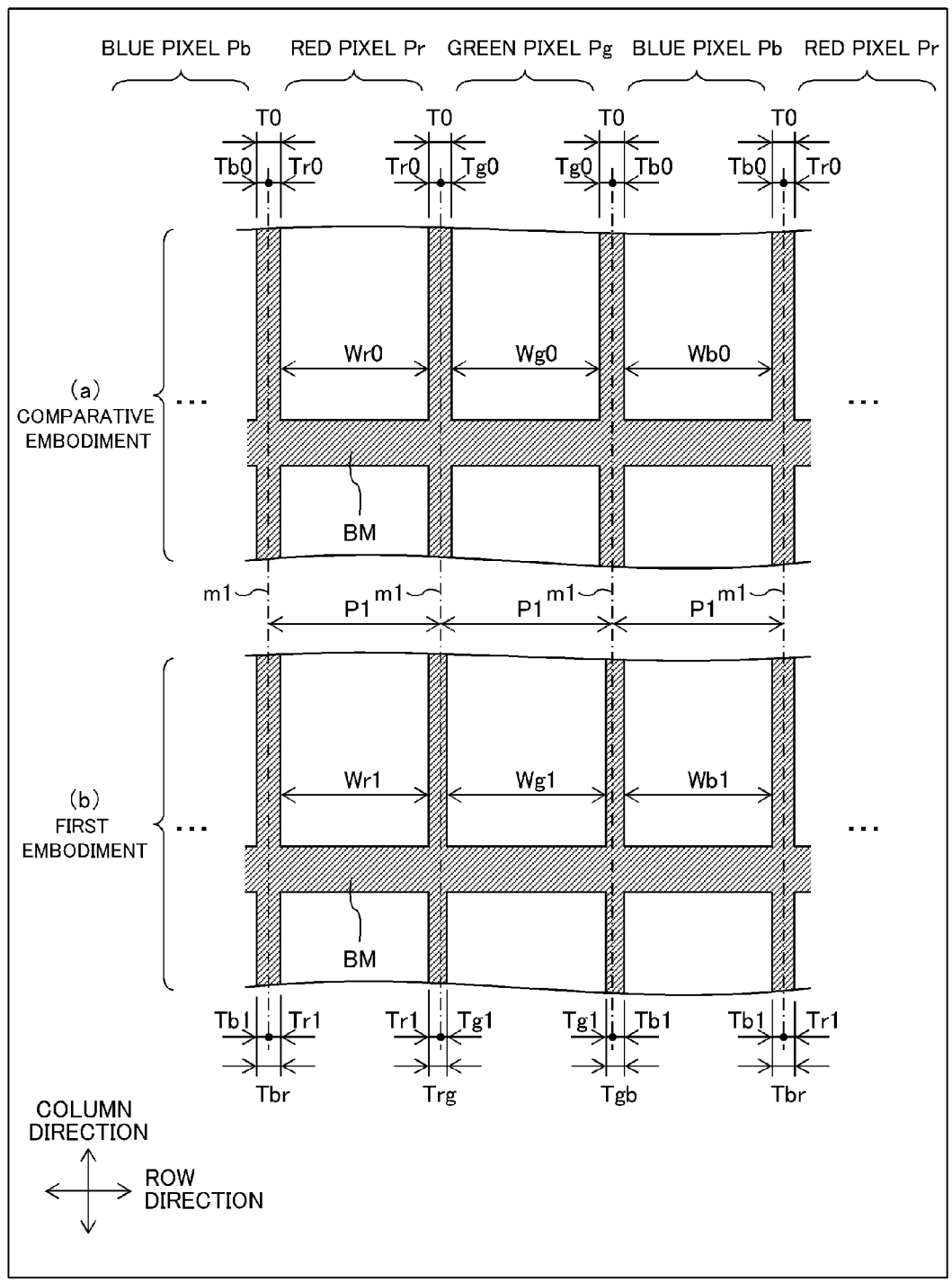
FIG. 6 is a plan view illustrating a configuration of a part of the black matrix.

FIG. 6 is a plan view illustrating a configuration of a part of the black matrix BM. In FIG. 6, (a) illustrates a configuration of a part of the black matrix BM according to a comparative embodiment, and (b) illustrates a configuration of a part of the black matrix BM according to the first embodiment. In the black matrix BM according to the comparative embodiment, widths T0 of all the black matrices BM are equal to each other, and the center line of the width T0 coincides with the center line m1 of the data line DL. Therefore, an aperture width Wr0 of the red pixel Pr, an aperture width Wg0 of the green pixel Pg, and an aperture width Wb0 of the blue pixel Pb are equal to each other. In contrast thereto, according to the first embodiment, as described above, it is possible to increase the aperture width Wg1 of the green pixel Pg more than the aperture width of the pixel according to the comparative embodiment while maintaining the aperture width Wr1 of the red pixel Pr and the aperture width Wb1 of the blue pixel Pb. In other words, the black matrix BM according to the first embodiment has a configuration that satisfies the following relational expression.

$$Wr1 = Wb1 = Wr0 = Wg0 = Wb0 < Wg1$$

Figure 7:
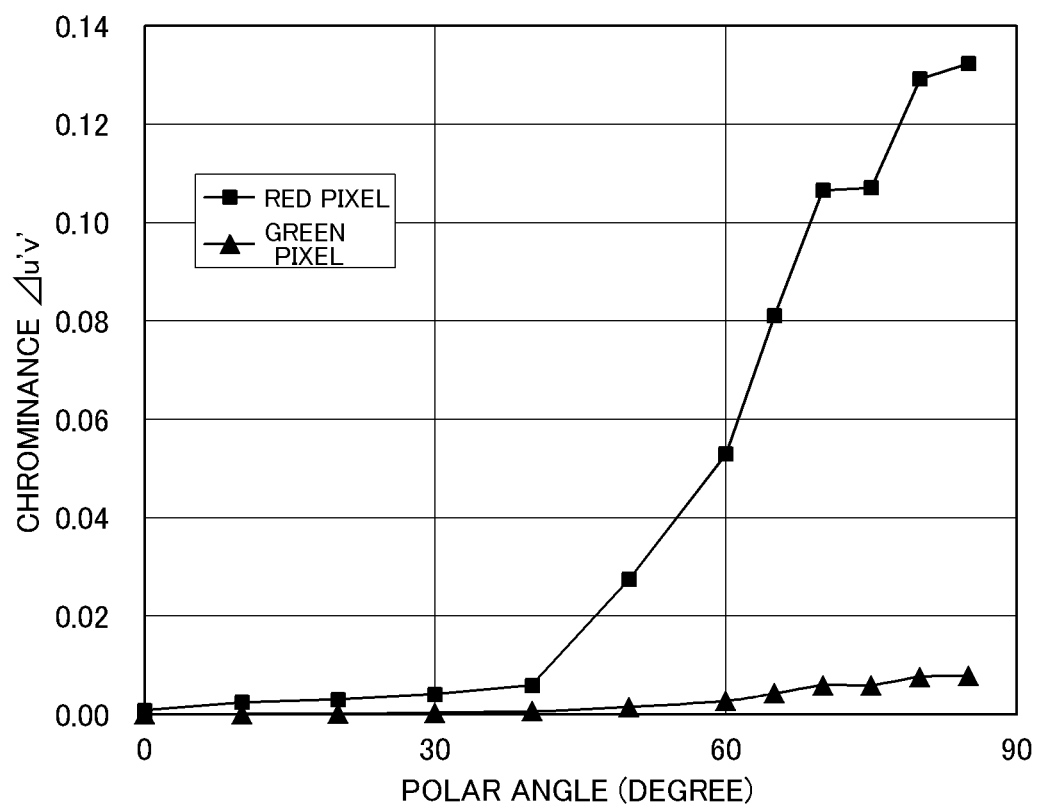
FIG. 7 is a graph showing measurement results of a chrominance according to a comparative embodiment.

FIG. 7 is a graph showing the measurement results of the chrominance $\Delta u'v'$ according to the comparative embodiment illustrated in FIG. 6A. Here, the widths T0 of all the black matrices BM are set to 10 μm, and the deviation amount between the TFT substrate SUB1 and the CF substrate SUB2 is set to 3 μm. Note that, in the measurement results, the chrominance $\Delta u'v'$ of the red pixel Pr and the chrominance $\Delta u'v'$ of the blue pixel Pb have substantially the same value, and hence the graph of FIG. 7 shows the chrominance $\Delta u'v'$ of the red pixel Pr as the representative.

Figure 8:
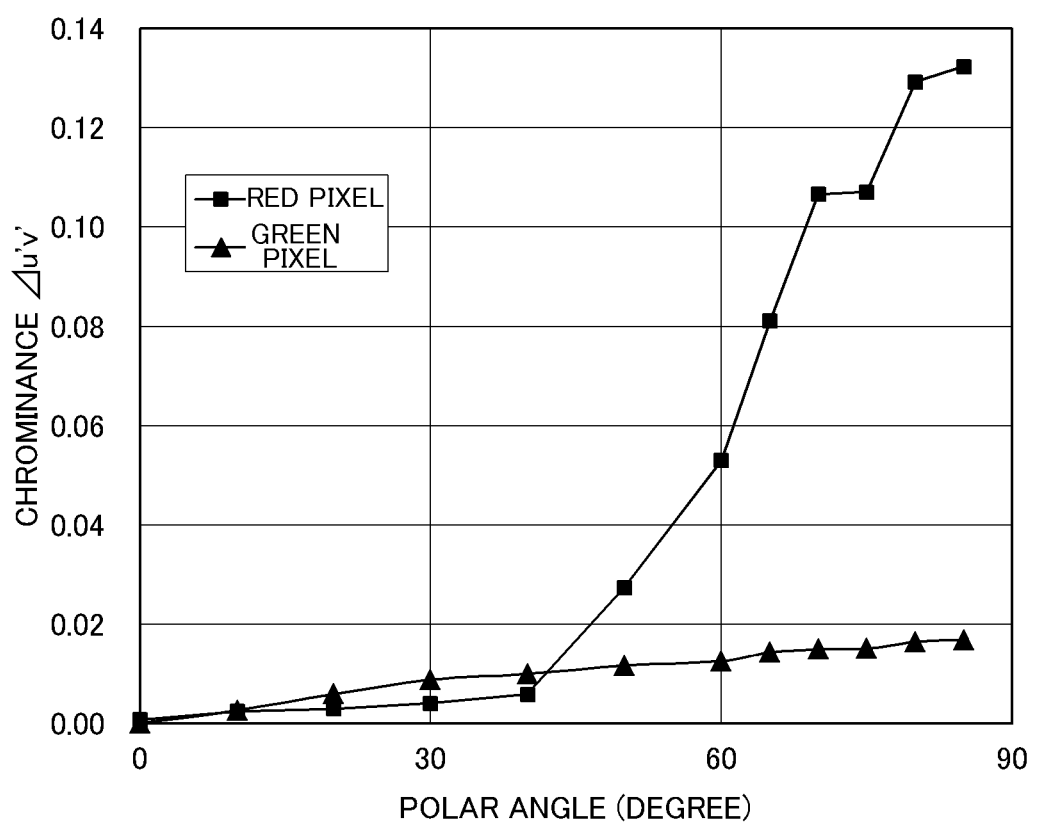
FIG. 8 is a graph showing measurement results of a chrominance according to the first embodiment.

FIG. 8 is a graph showing the measurement results of the chrominance $\Delta u'v'$ according to the first embodiment illustrated in FIG. 6B. Here, the width of the black matrix BM is set as follows. Further, the deviation amount between the TFT substrate SUB1 and the CF substrate SUB2 is set to 3 μm. Here, in the same manner, the chrominance $\Delta u'v'$ of the red pixel Pr and the chrominance $\Delta u'v'$ of the blue pixel Pb have substantially the same value, and hence the chrominance $\Delta u'v'$ of the red pixel Pr is shown as the representative.

Tbr=10 μm
Tb1=Tr1=5 μm
Trg=Tgb=6.5 μm
Tg1=1.5 μm

In comparison between the graphs of FIG. 7 and FIG. 8, the chrominances $\Delta u'v'$ of the red pixel Pr and the blue pixel Pb are not different between the comparative embodiment and the first embodiment, while the chrominance $\Delta u'v'$ of the green pixel Pg is larger in the first embodiment than in the comparative embodiment. However, the chrominance $\Delta u'v'$ of the green pixel Pg according to the first embodiment is still equal to or smaller than 0.02, which is the level at which the color mixture is hard to be recognized with the eye of the human. Therefore, at a level at which a displayed image is visually recognized, it is naturally understood that the first embodiment is equivalent to the comparative embodiment.

Further, the widths Trg and Tgb (=6.5 μm) of the black matrices BMrg and BMgb according to the first embodiment are smaller than the width T0 (=10 μm) of the black matrix BM according to the comparative embodiment, and the width Tbr of the black matrix BMbr (=10 μm) according to the first embodiment is equal to the width T0 (=10 μm) of the black matrix BM according to the comparative embodiment. In other words, the aperture width Wg1 of the green pixel Pg according to the first embodiment is larger than the aperture width Wg0 of the green pixel Pg according to the comparative embodiment (Wg1>Wg0), and the aperture width Wr1 of the red pixel Pr and the aperture width Wb1 of the blue pixel Pb according to the first embodiment are equal to the aperture width Wr0 of the red pixel Pr and the aperture width Wb0 of the blue pixel Pb according to the comparative embodiment (Wr1=Wb1=Wr0=Wb0). Therefore, according to the first embodiment, it is possible to improve the aperture ratio of the pixel more than the comparative embodiment.

As described above, according to the liquid crystal display device LCD1 of the first embodiment, it is possible to improve the aperture ratio of the pixel while suppressing the deterioration of the display quality ascribable to the color mixture.

Second Embodiment

A second embodiment of the present invention is described below with reference to the accompanying drawings. Note that, for convenience of the description, members having like functions as those of the members described in the first embodiment are denoted by like reference numerals (and symbols) and the description thereof is omitted. Further, the terms defined in the first embodiment are used in accordance with definitions thereof also in the second embodiment unless otherwise specified.

EXAMPLE 1

Figure 9:
FIG. 9 is a plan view illustrating a configuration of a liquid crystal display device according to Example 1 of a second embodiment of the present invention.

FIG. 9 is a plan view illustrating a configuration of an overall liquid crystal display device according to Example 1 of the second embodiment. In a liquid crystal display device LCD2, the red pixel Pr, the green pixel Pg, the blue pixel Pb, the blue pixel Pb, the green pixel Pg, and the red pixel Pr are arrayed in the row direction repetitively in the stated order, and the pixels P of the same color are arrayed in the column direction. In other words, the red pixel Pr, the green pixel Pg, the blue pixel Pb, the blue pixel Pb, the green pixel Pg, and the red pixel Pr form one pixel group, and a plurality of the pixel groups are arrayed in the row direction and the column direction. According to this array, in the row direction, the red pixels Pr are adjacent to each other, the blue pixels Pb are adjacent to each other, and the green pixel Pg is located between the red pixel Pr and the blue pixel Pb.

A configuration of the red pixel Pr, the green pixel Pg, and the blue pixel Pb in the TFT substrate SUB1 of the liquid crystal display device LCD2 is the same as the configuration illustrated in FIG. 2.

Figure 10:
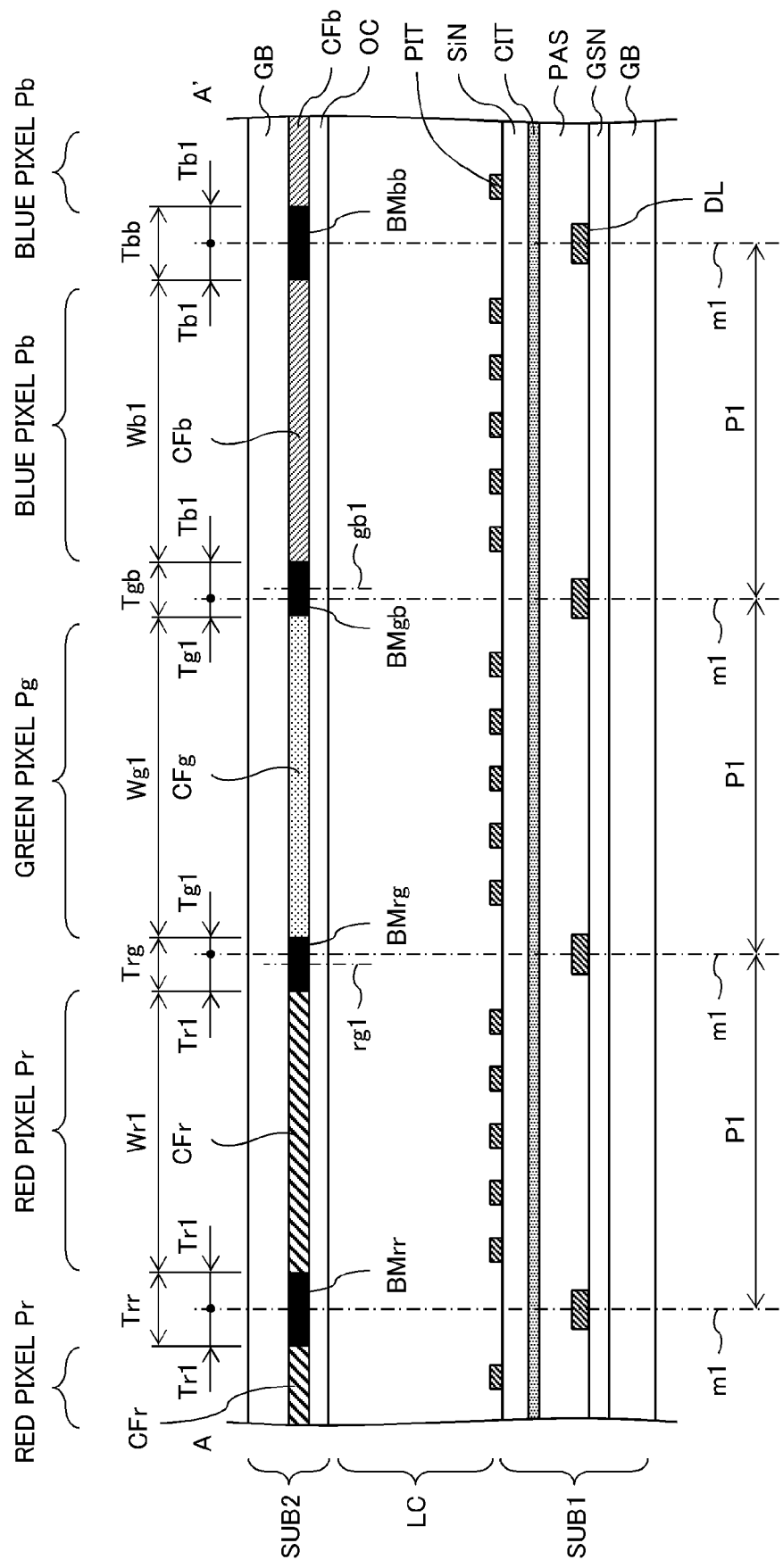
FIG. 10 is a sectional view of the liquid crystal display device according to Example 1, which is taken along the line A-A' corresponding to FIG. 2.
Figure 11:
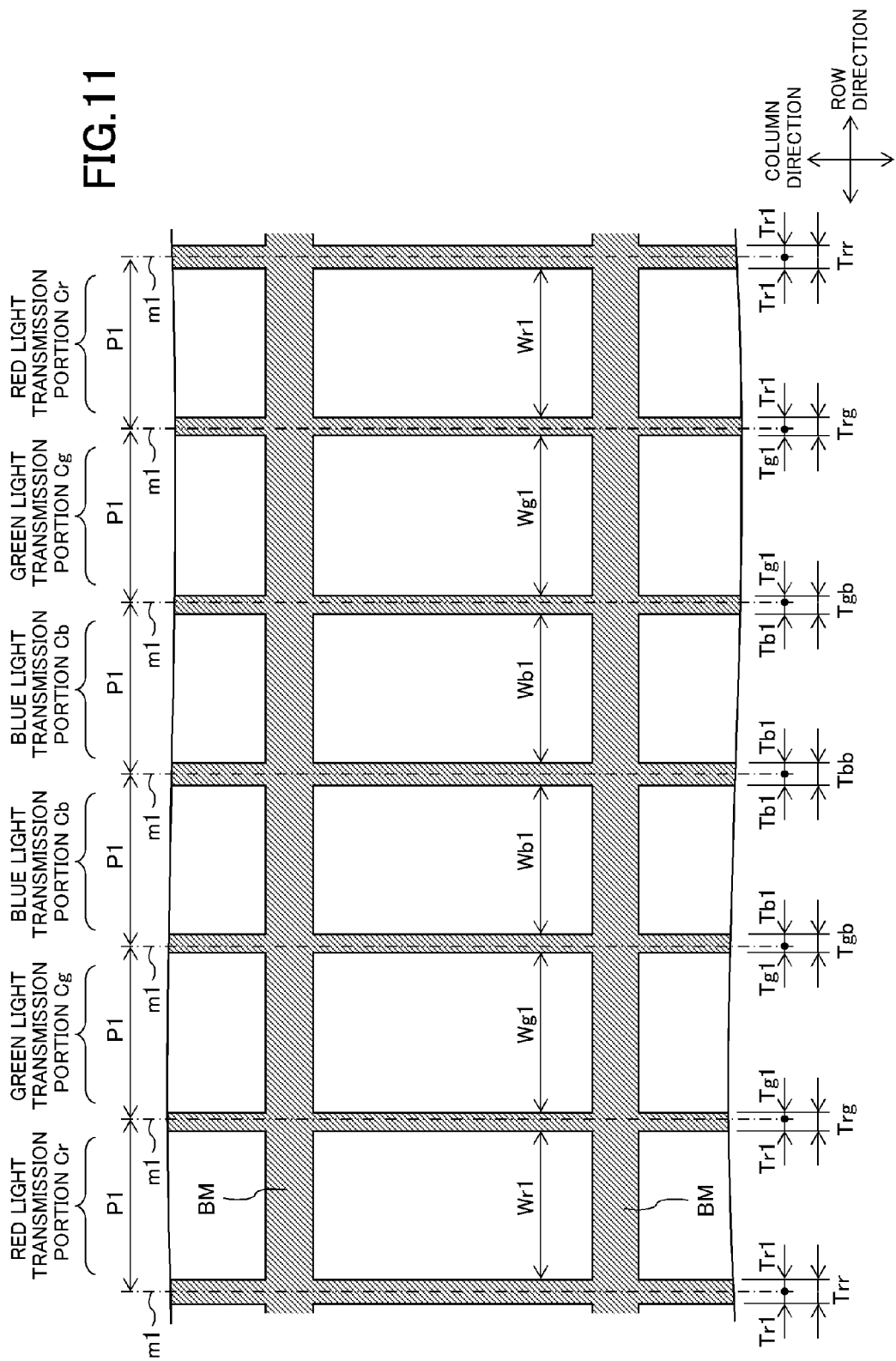
FIG. 11 is a plan view illustrating a configuration of a part of the black matrix.

FIG. 10 is a sectional view of the display panel PA of the liquid crystal display device LCD2 according to Example 1, which is taken along the line A-A' corresponding to FIG. 2. FIG. 11 is a plan view illustrating a configuration of a part of the black matrix BM provided to the CF substrate SUB2 of the liquid crystal display device LCD2 according to Example 1. FIG. 11 illustrates a state of the black matrix BM corresponding to the one pixel group viewed from the front surface side.

As illustrated in FIG. 10 and FIG. 11, the red light transmission portion Cr, the green light transmission portion Cg, the blue light transmission portion Cb, the blue light transmission portion Cb, the green light transmission portion Cg, and the red light transmission portion Cr are arrayed in the row direction repetitively in the stated order, the light transmission portions C for the same color are arrayed in the column direction, and the black matrix BM is formed in the area between the light transmission portions C that are adjacent to each other in the row direction and the column direction. The red pixel Pr, the green pixel Pg, the blue pixel Pb, the blue pixel Pb, the green pixel Pg, and the red pixel Pr are arrayed in the row direction repetitively in the stated order so as to correspond to the light transmission portion C, while the pixels P of the same color are arrayed in the column direction.

According to the above-mentioned configuration, the color mixture does not occur in a boundary between the adjacent red pixels Pr, and the color mixture does not occur in a boundary between the adjacent blue pixels Pb. Therefore, it is possible to suppress the occurrence of the color mixture more effectively than the case of the liquid crystal display device LCD1 according to the first embodiment.

Figure 12:
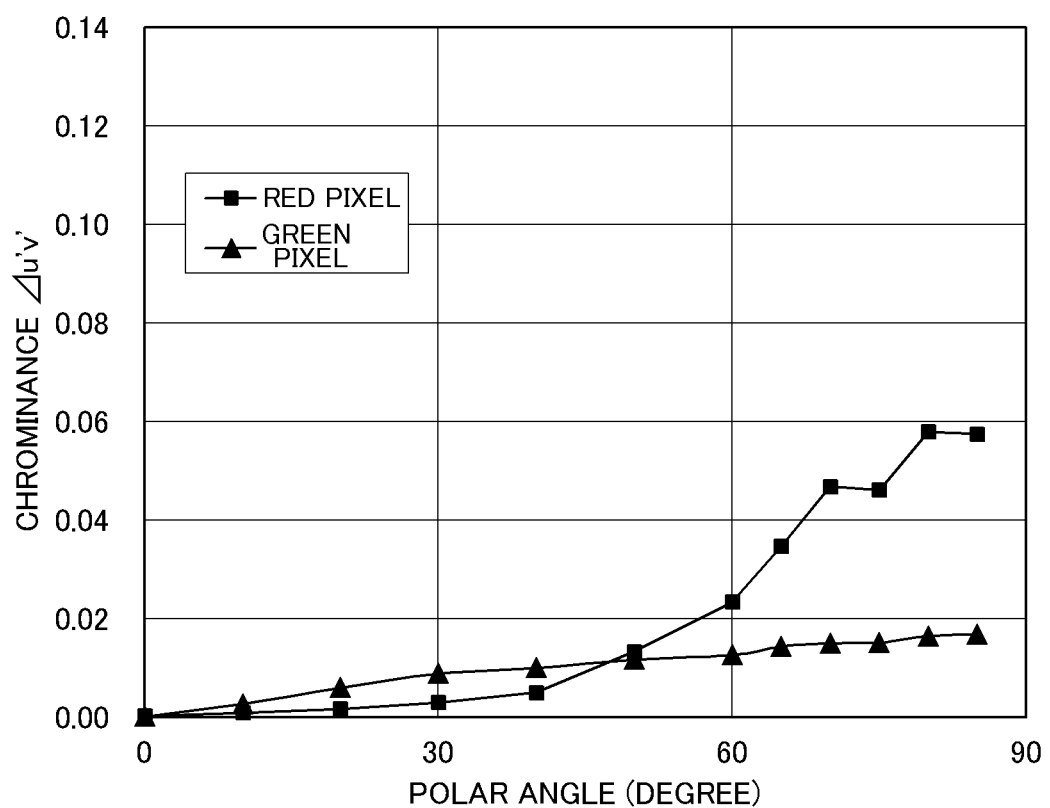
FIG. 12 is a graph showing an example of measurement results of a chrominance according to Example 1.

FIG. 12 is a graph showing the measurement results of the chrominance Δu'v' according to Example 1. The width of the black matrix BM is set as follows in the same manner as in the first embodiment. Further, the deviation amount between the TFT substrate SUB1 and the CF substrate SUB2 is set to 3 μm. Note that, the chrominance Δu'v' of the red pixel Pr and the chrominance Δu'v' of the blue pixel Pb have substantially the same value, and hence the chrominance Δu'v' of the red pixel Pr is shown as the representative.

Trr=Tbb=10 μm
Tb1=Tr1=5 μm
Trg=Tgb=6.5 μm
Tg1=1.5 μm

In comparison between the graph of FIG. 8 showing the measurement results according to the first embodiment and the graph of FIG. 12, the chrominance Δu'v' of the green pixel Pg is not different between Example 1 and the first embodiment, while the chrominances Δu'v' of the red pixel Pr and the blue pixel Pb are smaller in Example 1 than in the first embodiment. In other words, the liquid crystal display device LCD2 according to Example 1 can suppress the occurrence of the color mixture more effectively than the case of the liquid crystal display device LCD1 according to the first embodiment.

Figure 13:
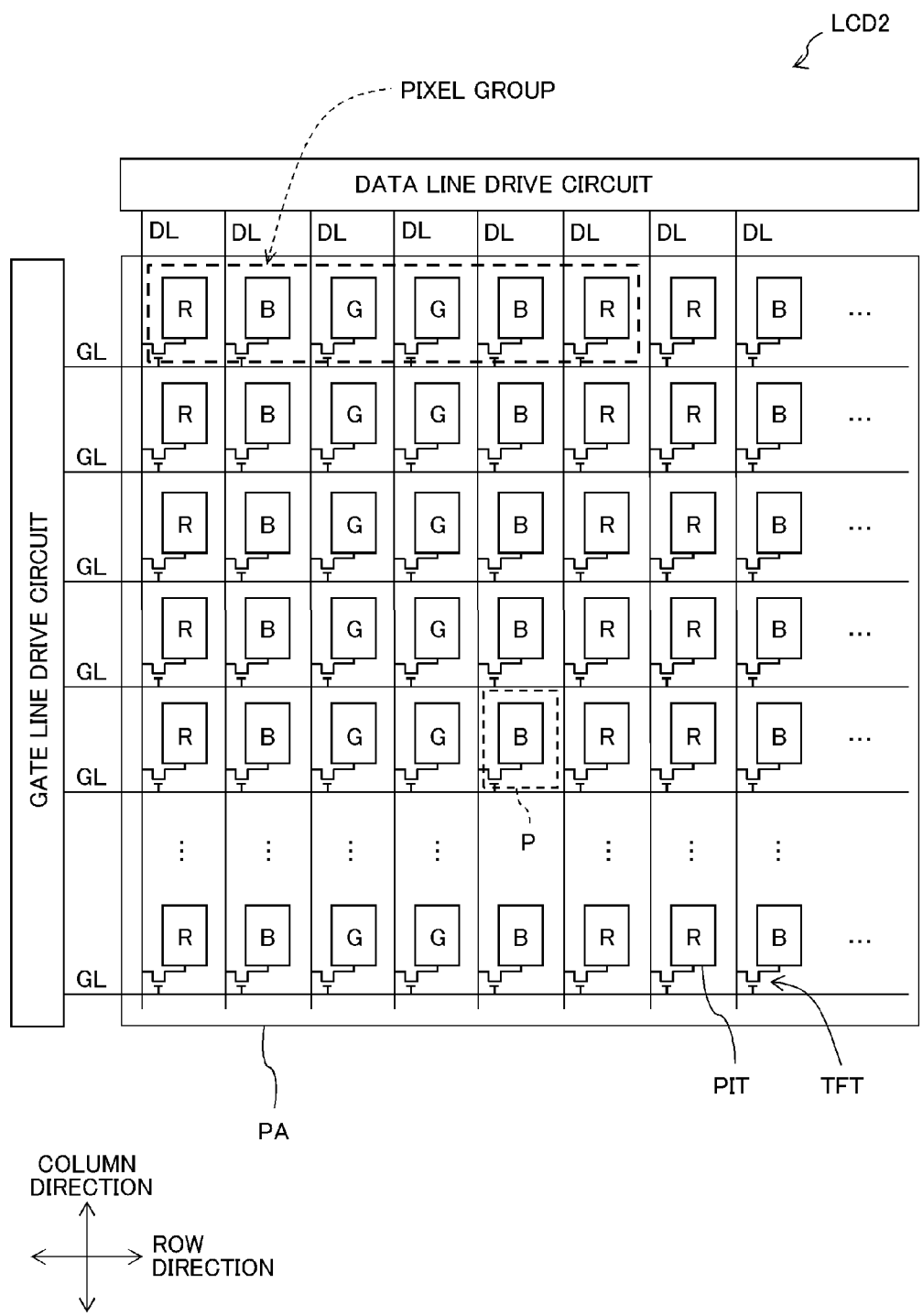
FIG. 13 is a plan view illustrating a configuration of another liquid crystal display device according to Example 1.
Figure 14:
FIG. 14 is a plan view illustrating a configuration of another liquid crystal display device according to Example 1.

A pixel array in which the pixels of the same color are adjacent to each other is not limited to the configuration illustrated in FIG. 9. Specifically, as illustrated in FIG. 13, the red pixel Pr, the blue pixel Pb, the green pixel Pg, the green pixel Pg, the blue pixel Pb, and the red pixel Pr may be arrayed in the row direction repetitively in the stated order. Further, as illustrated in FIG. 14, the green pixel Pg, the red pixel Pr, the blue pixel Pb, the blue pixel Pb, the red pixel Pr, and the green pixel Pg may be arrayed in the row direction repetitively in the stated order. According to those configurations, the color mixture does not occur between the adjacent pixels of the same color, and hence, in the same manner as the pixel array illustrated in FIG. 9, it is possible to suppress the occurrence of the color mixture more effectively than the case of the liquid crystal display device LCD1 according to the first embodiment.

EXAMPLE 2

In the case where the pixels of the same color are arrayed so as to be adjacent to each other as illustrated in Example 1, the color mixture does not occur between the adjacent pixels, and hence such a pixel can be set to have a large aperture width by reducing the width of the black matrix BM located between the pixels of the same color. Specifically, a width Trr of a black matrix BMrr located between the red pixels Pr can be set smaller than the width Trr of the black matrix BMrr according to Example 1 illustrated in FIG. 11. In the same manner, the width Tbb of a black matrix BMbb located between the blue pixels Pb can be set smaller than the width Tbb of the black matrix BMbb according to Example 1 illustrated in FIG. 11. With those settings, aperture widths Wr2 and Wb2 of the red pixel Pr and the blue pixel Pb can be set larger than the aperture widths Wr1 and Wb1 of the red pixel Pr and the blue pixel Pb according to Example 1 illustrated in FIG. 11. Therefore, in the same manner as in Example 1, it is possible to further improve the aperture ratio of the pixel while suppressing the occurrence of the color mixture. A specific configuration of the liquid crystal display device LCD2 according to Example 2 of the second embodiment, for further improving the aperture ratio, is described below.

Figure 15:
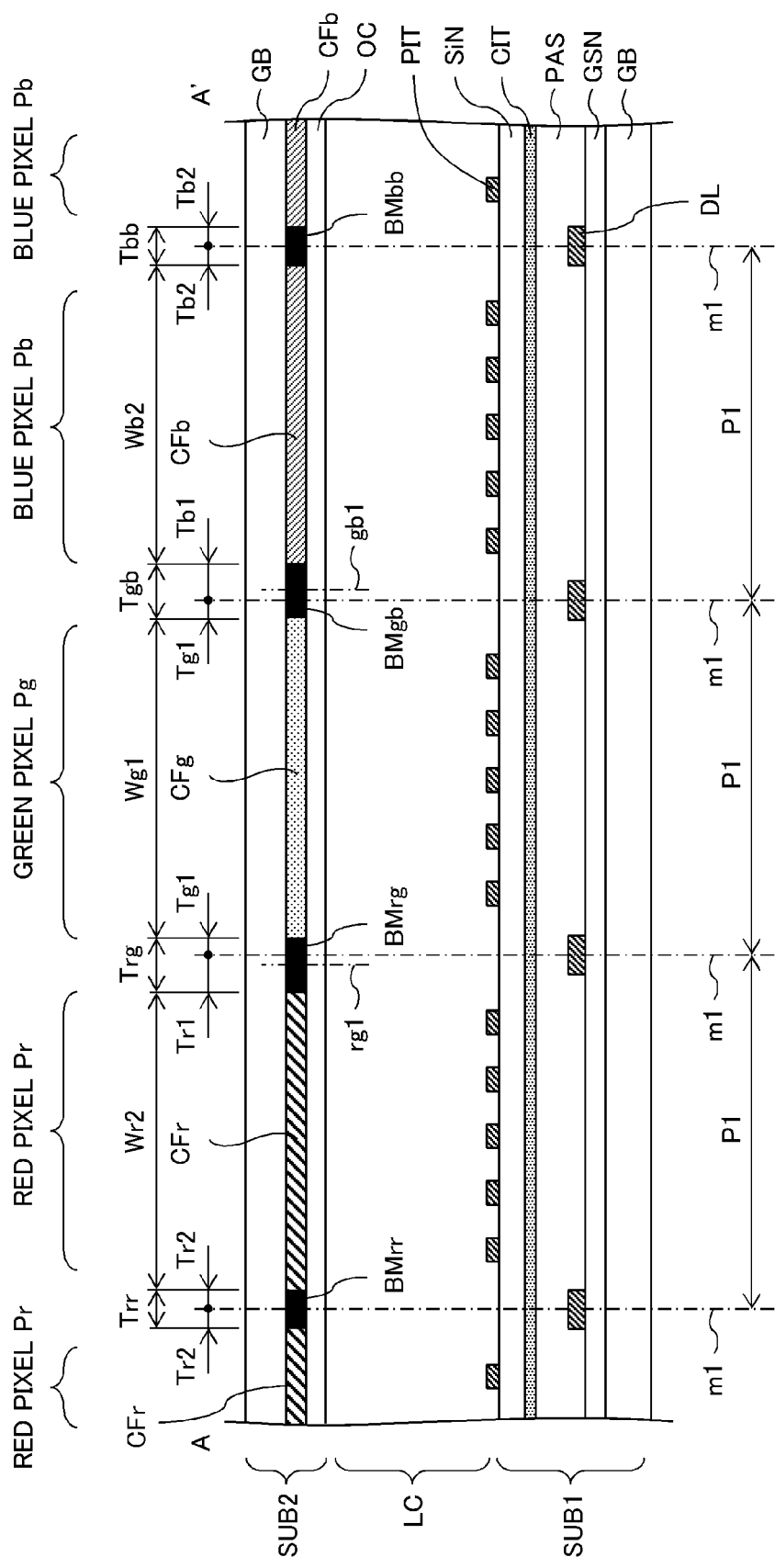
FIG. 15 is a sectional view of a liquid crystal display device according to Example 2 of the second embodiment, which is taken along the line A-A' corresponding to FIG. 2.
Figure 16:
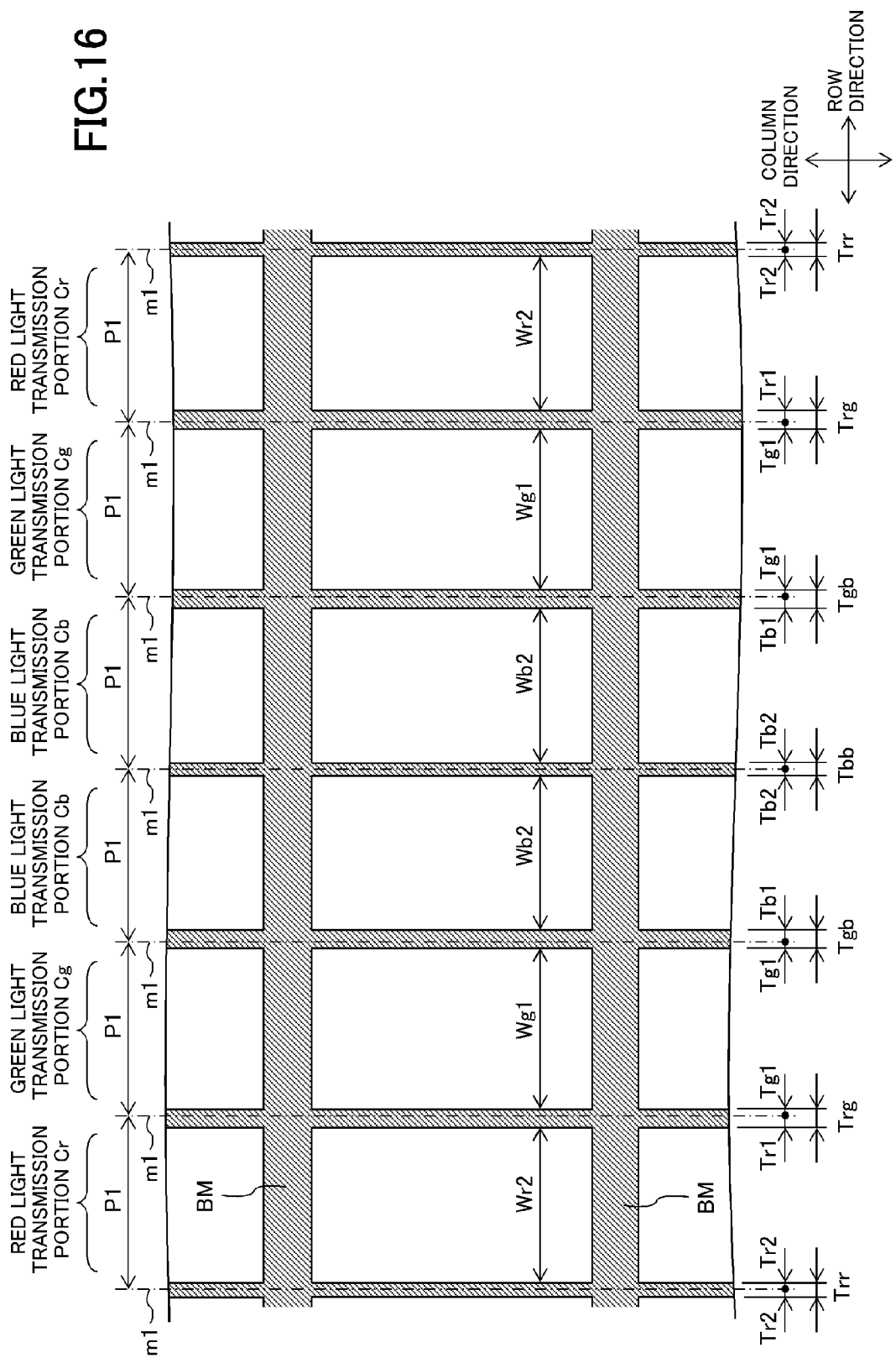
FIG. 16 is a plan view illustrating a configuration of a part of the black matrix.

FIG. 15 is a sectional view of the display panel PA of the liquid crystal display device LCD2 according to Example 2 of the second embodiment, which is taken along the line A-A' corresponding to FIG. 2. FIG. 16 is a plan view illustrating a configuration of a part of the black matrix BM provided to the CF substrate SUB2 of the liquid crystal display device LCD2 according to Example 2. FIG. 16 illustrates a state of the black matrix BM corresponding to the one pixel group viewed from the front surface side.

As illustrated in FIG. 15 and FIG. 16, the red light transmission portion Cr, the green light transmission portion Cg, the blue light transmission portion Cb, the blue light transmission portion Cb, the green light transmission portion Cg, and the red light transmission portion Cr are arrayed in the row direction repetitively in the stated order, the light transmission portions C for the same color are arrayed in the column direction, and the black matrix BM is formed in the area between the light transmission portions C that are adjacent to each other in the row direction and the column direction. The red pixel Pr, the green pixel Pg, the blue pixel Pb, the blue pixel Pb, the green pixel Pg, and the red pixel Pr are arrayed in the row direction repetitively in the stated order so as to correspond to the light transmission portion C, while the pixels P of the same color are arrayed in the column direction.

The center line of the black matrix BMrr located in a boundary between the red pixels Pr (red light transmission portions Cr) coincides with the center line m1 of the data line DL overlapping with the black matrix BMrr in the plan view. A center line rg1 of a black matrix BMrg located in a boundary between the red pixel Pr and the green pixel Pg (green light transmission portion Cg) is displaced toward a red pixel Pr side from the center line m1 of the data line DL overlapping with the black matrix BMrg in the plan view. A center line gb1 of a black matrix BMgb located in a boundary between the green pixel Pg and the blue pixel Pb (blue light transmission portion Cb) is displaced toward a blue pixel Pb side from the center line m1 of the data line DL overlapping with the black matrix BMgb in the plan view. The center line of the black matrix BMbb located in a boundary between the blue pixels Pb coincides with the center line m1 of the data line DL overlapping with the black matrix BMbb in the plan view. Further, the row-wise width Trr of the black matrix BMrr and the row-wise width Tbb of the black matrix BMbb are equal to each other (Trr=Tbb), and the row-wise width Trg of the black matrix BMrg and the row-wise width Tgb of the black matrix BMgb are equal to each other (Trg=Tgb). Further, each of the row-wise width Trr of the black matrix BMrr and the row-wise width Tbb of the black matrix BMbb is smaller than each of the row-wise width Trg of the black matrix BMrg and the row-wise width Tgb of the black matrix BMgb (Trr=Tbb<Trg=Tgb). In addition, a distance Tr2 between the center line m1 of the data line DL and the edge portion on the red pixel Pr side in the width Trr of the black matrix BMrr is smaller than the distance Tr1 between the center line m1 of the data line DL and the edge portion on the red pixel Pr side in the width Trg of the black matrix BMrg (Tr2<Tr1). A distance Tb2 between the center line m1 of the data line DL and the edge portion on the blue pixel Pb side in the width Tbb of the black matrix BMbb is smaller than the distance Tb1 between the center line m1 of the data line DL and the edge portion on the blue pixel Pb side in the width Tgb of the black matrix BMgb (Tb2<Tb1). In the width Trg of the black matrix BMrg, the distance Tg1 between the center line m1 of the data line DL and the edge portion on the green pixel Pg side is smaller than the distance Tr1 between the center line m1 and the edge portion on the red pixel Pr side (Tg1<Tr1). In the width Tgb of the black matrix BMgb, the distance Tg1 between the center line m1 of the data line DL and the edge portion on the green pixel Pg side is smaller than the distance Tb1 between the center line m1 and the edge portion on the blue pixel Pb side (Tg1<Tb1).

Figure 17:
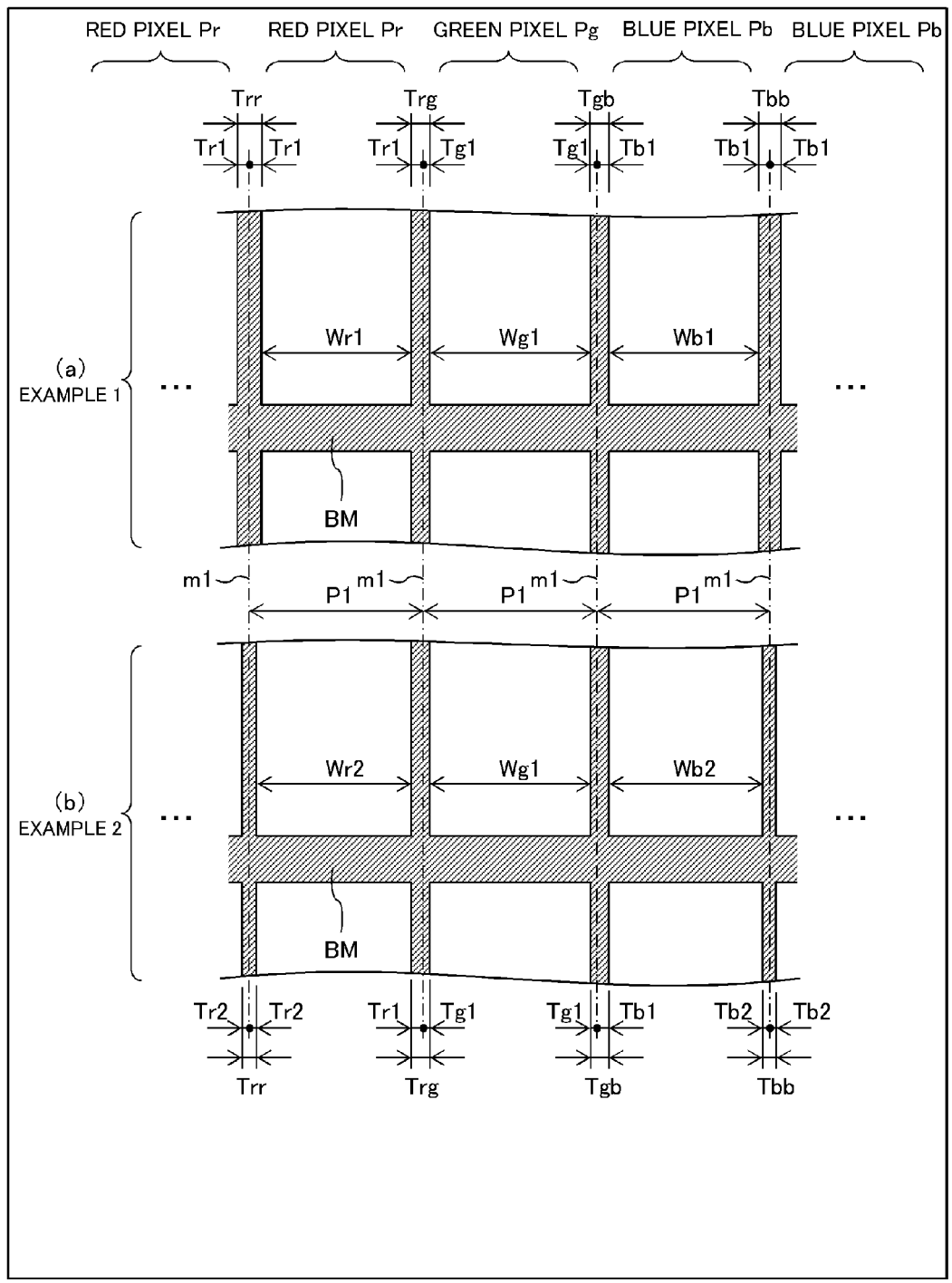
FIG. 17 is a plan view illustrating a configuration of a part of the black matrix.

FIG. 17 is a plan view illustrating a configuration of a part of the black matrix BM. In FIG. 17, (a) illustrates a configuration of a part of the black matrix BM according to Example 1, and (b) illustrates a configuration of a part of the black matrix BM according to Example 2. According to the configuration of Example 2, the aperture width Wr2 of the red pixel Pr is larger than the aperture width Wr1 of the red pixel Pr according to Example 1 by (Tr1−Tr2). Further, the aperture width Wb2 of the blue pixel Pb is larger than the aperture width Wb1 of the blue pixel Pb according to Example 1 by (Tb1−Tb2).

Figure 18:
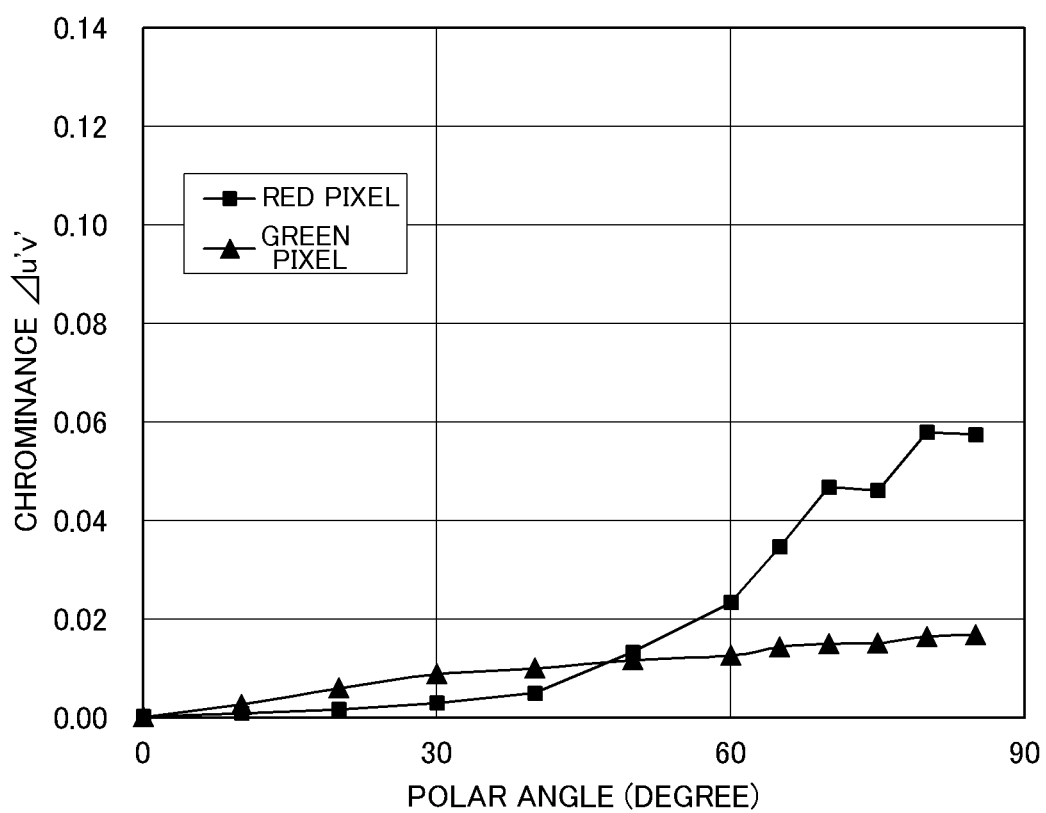
FIG. 18 is a graph showing an example of measurement results of a chrominance according to Example 2.

FIG. 18 is a graph showing the measurement results of the chrominance Δu'v' according to Example 2. Here, the width of the black matrix BM is set as follows. Further, the deviation amount between the TFT substrate SUB1 and the CF substrate SUB2 is set to 3 μm. Note that, the chrominance Δu'v' of the red pixel Pr and the chrominance Δu'v' of the blue pixel Pb have substantially the same value, and hence the graph of FIG. 18 shows the chrominance Δu'v' of the red pixel Pr as the representative.

Trr=Tbb=3 μm
Trg=Tgb=6.5 μm
Tr2=Tg1=Tb2=1.5 μm
Tr1=Tb1=5 μm

In comparison between the graph of FIG. 8 showing the measurement results according to the first embodiment and the graph of FIG. 18, the chrominance Δu'v' of the green pixel Pg is not different between Example 2 and the first embodiment, while the chrominances Δu'v' of the red pixel Pr and the blue pixel Pb are smaller in Example 2 than in the first embodiment. In other words, the liquid crystal display device LCD2 according to Example 2 can suppress the occurrence of the color mixture more effectively than the case of the liquid crystal display device LCD1 according to the first embodiment.

Further, in comparison between the graph of FIG. 12 showing the measurement results according to Example 1 of the second embodiment and the graph of FIG. 18, the respective chrominances Δu'v' of the red pixel Pr, the green pixel Pg, and the blue pixel Pb are the same. In other words, even when the aperture width of the pixel is increased by reducing the width of the black matrix BM located between the pixels of the same color, the liquid crystal display device LCD2 according to Example 2 is not subject to the deterioration of the display quality ascribable to the color mixture compared to the liquid crystal display device LCD2 according to Example 1. Therefore, it is possible to further improve the aperture ratio of the pixel while suppressing the color mixture.

Here, the pixel array of the liquid crystal display device LCD2 according to Example 2 is not limited to the pixel array illustrated in FIG. 9, and may be the pixel array illustrated in FIG. 13 or FIG. 14. However, in order to maximize the aperture ratio of the pixel, it is preferred that the pixel array illustrated in FIG. 9 be employed. In other words, it is preferred that the red pixel Pr, the green pixel Pg, the blue pixel Pb, the blue pixel Pb, the green pixel Pg, and the red pixel Pr be arrayed in the row direction repetitively in the stated order and that the aperture widths of the pixels of the red pixel Pr and the blue pixel Pb be increased. In other words, it is preferred that, in the pixel array, the green pixels Pg be arrayed so as to be sandwiched between the red pixel Pr and the blue pixel Pb without being adjacent to each other. The reason that the pixel array illustrated in FIG. 9 is preferred is described below.

As described above, three patterns of FIG. 9, FIG. 13, and FIG. 14 according to Example 1 are conceivable as the pixel array in which the pixels of the same color are adjacent to each other. Both in the configurations illustrated in FIG. 13 and FIG. 14, the green pixels Pg are arrayed so as to be adjacent to each other. In this case, there exists a part in which the red pixel Pr and the blue pixel Pb are adjacent to each other. As described above, the green pixel Pg can have the aperture width increased by reducing the width of the black matrix BM close to the green pixel Pg because the eye of the human is highly resistant to the color mixture in the green color. However, the color mixture that deteriorates the display quality of both the red pixel Pr and the blue pixel Pb occurs when a width Trb of a black matrix BMrb located between the red pixel Pr and the blue pixel Pb is reduced to increase the aperture width. Therefore, it is difficult to reduce the width Trb of the black matrix BMrb located between the red pixel Pr and the blue pixel Pb. Therefore, in order to maximize the aperture ratio of the pixel, it is effective to employ a pixel array in which the red pixel Pr and the blue pixel Pb are not adjacent to each other. This point is verified by taking the following specific example.

Figure 19:
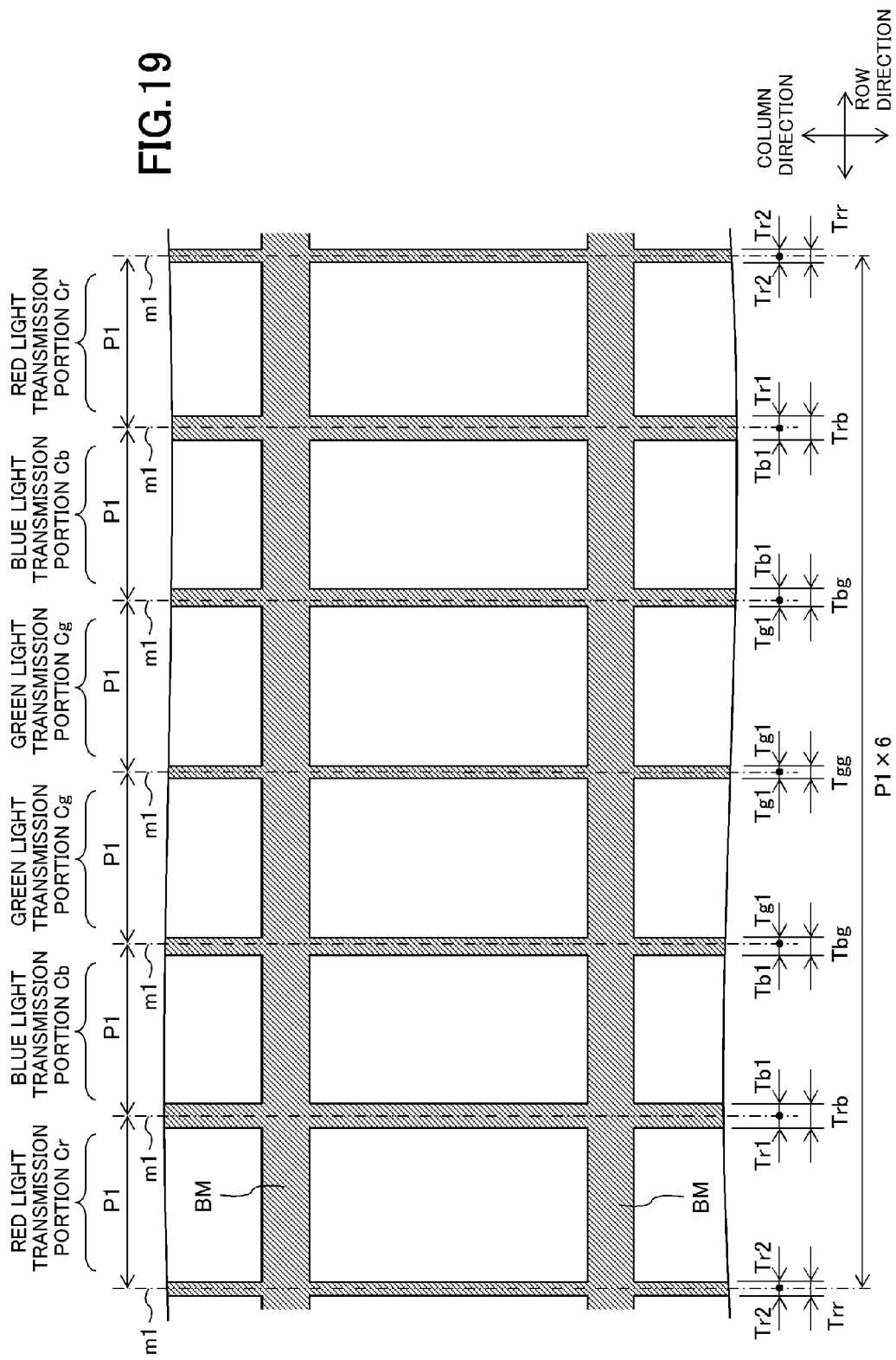
FIG. 19 is a plan view illustrating a configuration of a part of the black matrix.

FIG. 19 is a plan view illustrating a configuration (corresponding to one pixel group) of a part of the black matrix BM in the configuration illustrated in FIG. 13. FIG. 20 is a plan view illustrating a configuration (corresponding to one pixel group) of a part of the black matrix BM according to Example 2.

In FIG. 19, for example, with regard to the width of the black matrix BM, the width of the black matrix BM located between the pixels of the same color is set to 3 μm and the widths of the black matrices BM located between the green pixel Pg and the other color pixels (Pr and Pb) are set to 6.5 μm in the same manner as in Example 2 illustrated in FIG. 15, while the width of the black matrix BM located between the red pixel Pr and the blue pixel Pb is set to 10 μm in the same manner as in the first embodiment illustrated in FIG. 6. In other words, the respective widths of the black matrices BM illustrated in FIG. 19 are set as follows.

Trb=10 μm
Tbg=6.5 μm
Trr=Tgg=3 μm
Tr1=Tb1=5 μm
Tr2=Tg1=1.5 μm

According to the above-mentioned condition, in the configuration illustrated in FIG. 19 (pixel array illustrated in FIG. 13), aperture widths Wx1 of the pixels corresponding to the entire one pixel group can be expressed by the following expression. P1 represents an array interval between the data lines DL. Note that, also in the pixel array illustrated in FIG. 14, the aperture widths of the pixels corresponding to the entire one pixel group can be expressed by the following expression.

$$Wx1 = P1 \times 6 - (Tr2 \times 2 + Tr1 \times 2 + Tb1 \times 4 + Tg1 \times 4)$$
$$= P1 \times 6 - 39 \text{ (μm)}$$

In contrast thereto, in the pixel array according to Example illustrated in FIG. 20, aperture widths Wx2 of the pixels corresponding to the entire one pixel group can be expressed by the following expression.

$$Wx2 = P1 \times 6 - (Tr2 \times 2 + Tr1 \times 2 + Tb1 \times 2 + Tg1 \times 4 + Tb2 \times 2)$$
$$= P1 \times 6 - 32 \text{ (μm)}$$

According to a comparison result (Wx1<Wx2) of the aperture widths Wx1 and Wx2 calculated above, it is understood that the aperture ratio of the pixel is higher in the configuration according to Example 2, in other words, in the configuration in which the green pixels Pg are arrayed so as to be sandwiched between the red pixel Pr and the blue pixel Pb without being adjacent to each other. Therefore, in order to maximize the aperture ratio of the pixel, it is preferred that the configuration (pixel array) according to Example 2 be employed.

Note that, even in the configuration illustrated in FIG. 13, as illustrated in FIG. 19, the width Trr of the black matrix BMrr located between the adjacent red pixels Pr and a width Tgg of a black matrix BMgg located between the adjacent green pixels Pg can be set to, for example, 3 μm, and hence it is possible to improve the aperture ratio more than the liquid crystal display device LCD1 according to the first embodiment. The same applies to the configuration illustrated in FIG. 14.

In the above-mentioned description, the light transmission portion C includes the red light transmission portion Cr, the green light transmission portion Cg, and the blue light transmission portion Cb. However, the present invention is not limited thereto, and a light transmission portion C for transmitting light in a color other than red, green, or blue may be included. Further, the plurality of pixels P may include a pixel P of the color other than red, green, or blue so as to correspond thereto.

According to the configuration of the display device of each of the above-mentioned embodiments, it is possible to increase the aperture width of a green pixel, which is hardly influenced by the deterioration of the display quality ascribable to the color mixture. Therefore, even when deviation is caused when the two substrates are bonded together, it is possible to improve the aperture ratio of the pixel while suppressing the deterioration of the display quality ascribable to the color mixture.

While there have been described what are at present considered to be certain embodiments of the invention, it will be understood that various modifications may be made thereto, and it is intended that the appended claims cover all such modifications as fall within the true spirit and scope of the invention.

What is claimed is:
1. A display device, comprising:
a first substrate on a back surface side; and
a second substrate on a display surface side,
the first substrate and the second substrate being opposed to each other,
the first substrate comprising:
a plurality of data lines formed thereon;
a plurality of gate lines formed thereon; and
a plurality of pixel electrodes formed thereon and arranged so as to form an array of pixels aligned in a column direction in which the plurality of data lines extend and in a row direction in which the plurality of gate lines extend,
the second substrate comprising:
a plurality of light transmission portions formed thereon, for transmitting light, and arranged so as to correspond to each of the plurality of pixels; and
a light shielding portion formed thereon, for blocking light from transmitting therethrough, and formed around each of the plurality of light transmission portions,
the plurality of pixels comprising:
a first pixel corresponding to a first light transmission portion for transmitting first color light;
a second pixel corresponding to a second light transmission portion for transmitting second color light; and a third pixel corresponding to a third light transmission portion for transmitting third color light, wherein:

the pixels aligned in the row direction define pixel groups, in each of which the first pixel, the second pixel, the third pixel, the third pixel, the second pixel, and the first pixel are arrayed in a repeating pattern of the stated order in the row direction, and a row-wise width of the light shielding portion located between the adjacent two third pixels is smaller than a row-wise width of the light shielding portion located between the third pixel and the second pixel.

2. The display device according to claim 1, wherein a row-wise width of the light shielding portion located between the adjacent two first pixels is smaller than a row-wise width of the light shielding portion located between the first pixel and the second pixel.

3. The display device according to claim 1, wherein the first pixel is a red pixel corresponding to a red light transmission portion for transmitting red light, the second pixel is a green pixel corresponding to a green light transmission portion for transmitting green light, and the third pixel is a blue pixel corresponding to a blue light transmission portion for transmitting blue light.

4. The display device according to claim 1, wherein the first pixel is a red pixel corresponding to a red light transmission portion for transmitting red light, the second pixel is a blue pixel corresponding to a blue light transmission portion for transmitting blue light, and the third pixel is a green pixel corresponding to a green light transmission portion for transmitting green light.

5. The display device according to claim 1, wherein the first pixel is a green pixel corresponding to a green light transmission portion for transmitting green light, the second pixel is a red pixel corresponding to a red light transmission portion for transmitting red light, and the third pixel is a blue pixel corresponding to a blue light transmission portion for transmitting blue light.

6. The display device according to claim 2, wherein a distance between the adjacent two drain lines located at both sides of the first pixels, a distance between the adjacent two drain lines located at both sides of the second pixels, and a distance between the adjacent two drain lines located at both sides of the third pixels are substantially equal to each other.

* * * * *